(12) United States Patent
Freymuth et al.

(10) Patent No.: US 10,844,643 B2
(45) Date of Patent: Nov. 24, 2020

(54) WINDOW LIFTER ASSEMBLY WITH MULTIPART PANE GUIDE ELEMENT FOR A FLUSH PANE DESIGN, AND ASSEMBLY METHOD

(71) Applicant: BROSE FAHRZEUGTEILE GMBH & CO. KOMMANDITGESELLSCHAFT, BAMBERG, Bamberg (DE)

(72) Inventors: Ian Freymuth, Sant Pere de Ribes/Rocamar (ES); Manuel Griesmann, Stoetten am Auerberg (DE); Matthias Heppner, Burgkunstadt (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 119 days.

(21) Appl. No.: 15/774,553

(22) PCT Filed: Jan. 18, 2017

(86) PCT No.: PCT/EP2017/050913
§ 371 (c)(1),
(2) Date: May 8, 2018

(87) PCT Pub. No.: WO2017/129451
PCT Pub. Date: Aug. 3, 2017

(65) Prior Publication Data
US 2019/0309553 A1 Oct. 10, 2019

(30) Foreign Application Priority Data
Jan. 26, 2016 (DE) .................. 10 2016 201 106

(51) Int. Cl.
*B60J 5/04* (2006.01)
*E05D 15/16* (2006.01)
(Continued)

(52) U.S. Cl.
CPC .............. *E05D 15/165* (2013.01); *B60J 1/17* (2013.01); *E05F 7/00* (2013.01); *E05F 11/382* (2013.01);
(Continued)

(58) Field of Classification Search
CPC ........ E05D 15/165; E05D 15/689; B60J 1/17; E05F 11/382; E05Y 2600/56; E05Y 2600/53; E05Y 2201/64; E05Y 2900/55
(Continued)

(56) References Cited

U.S. PATENT DOCUMENTS 3,385,000 A * 5/1968 Sturtevant ................ B60J 10/74
49/440
3,703,053 A * 11/1972 De Rees .................... B60J 1/17
49/428
(Continued)

FOREIGN PATENT DOCUMENTS

CN 1791728 A 6/2006
CN 105246723 A 1/2016
(Continued)

OTHER PUBLICATIONS

Japanese Notification of Reasons for Rejection dated Oct. 15, 2019 issued in corresponding JP Application No. 2018-557198, 7 pages, with English translation, 6 pages.
(Continued)

*Primary Examiner* — Jerry E Redman
(74) *Attorney, Agent, or Firm* — Lewis Roca Rothgerber Christie LLP

(57) ABSTRACT

It is provided a window lifter assembly, comprising an adjustable window pane for a vehicle window lifter, in
(Continued)

which the window pane in a closed state is flush with upper and/or lateral body parts which border a window opening, to be closed by the window pane, in a window frame. The window lifter assembly furthermore has at least one pane guide element which is fixed on the window pane in the region of a lateral pane edge and at least one frame-side guide element at which the pane guide element is held displaceably on the window opening. The at least one pane guide element is of multi-part design with at least one first guide part and a second guide part.

20 Claims, 15 Drawing Sheets

(51) Int. Cl.
 *B60J 1/17* (2006.01)
 *E05F 7/00* (2006.01)
 *E05F 11/38* (2006.01)
(52) U.S. Cl.
 CPC ..... *E05Y 2201/708* (2013.01); *E05Y 2600/53* (2013.01); *E05Y 2600/56* (2013.01); *E05Y 2800/692* (2013.01); *E05Y 2900/55* (2013.01)
(58) Field of Classification Search
 USPC .......................................... 49/502, 440, 441
 See application file for complete search history.

(56) References Cited

U.S. PATENT DOCUMENTS

| | | | | |
|---|---|---|---|---|
| 4,240,227 A * | 12/1980 | Hasler | ............... | B60J 10/79 49/348 |
| 4,418,498 A * | 12/1983 | Wanlass | ............... | E05F 11/382 49/348 |
| 4,483,100 A * | 11/1984 | Blankenburg | ........ | E05F 11/426 49/352 |
| 4,490,942 A * | 1/1985 | Arnheim | ............... | B60J 10/24 49/374 |
| 4,567,691 A * | 2/1986 | Warner | ............... | B60J 10/79 49/374 |
| 4,604,830 A * | 8/1986 | Maeda | ............... | B60J 10/248 49/374 |
| 4,608,779 A | 9/1986 | Maeda et al. | | |
| 4,611,435 A | 9/1986 | Warner | | |
| 4,616,445 A * | 10/1986 | Watanabe | ............... | B60J 10/79 49/227 |
| 4,625,459 A * | 12/1986 | Warner | ............... | B60J 10/235 49/489.1 |
| 4,628,637 A * | 12/1986 | Okada | ............... | B60J 10/79 49/374 |
| 4,631,865 A * | 12/1986 | Motonami | ............... | B60J 10/79 49/374 |
| 4,662,115 A | 5/1987 | Ohya et al. | | |
| 4,744,174 A | 5/1988 | Mesnel et al. | | |
| 4,823,511 A * | 4/1989 | Herliczek | ............... | B60J 10/74 428/83 |
| 4,874,201 A * | 10/1989 | Scaglietti | ............... | B60J 10/24 296/201 |
| 4,875,307 A * | 10/1989 | Barbero | ............... | B60J 10/24 49/374 |
| 4,920,697 A | 5/1990 | Vail et al. | | |
| 4,932,161 A * | 6/1990 | Keys | ............... | B60J 10/24 49/374 |
| 4,969,293 A | 11/1990 | Hutchinson | | |
| 5,036,621 A | 8/1991 | Iwasaki | | |
| 5,040,333 A | 8/1991 | Mesnel et al. | | |
| 5,054,242 A * | 10/1991 | Keys | ............... | B60J 10/24 49/374 |
| 5,086,589 A * | 2/1992 | dibenedetto | ............... | B60J 5/0402 296/146.3 |
| 5,613,325 A * | 3/1997 | Mariel | ............... | B32B 17/10036 49/374 |
| 5,729,930 A | 3/1998 | Schust et al. | | |
| 5,732,509 A * | 3/1998 | Buehler | ............... | B60J 10/79 49/440 |
| 5,864,987 A | 2/1999 | Mariel et al. | | |
| 6,141,910 A * | 11/2000 | Kobrehel | ............... | B60J 5/0402 49/348 |
| 6,966,149 B2 | 11/2005 | Fenelon | | |
| 8,434,267 B2 * | 5/2013 | Bocutto | ............... | B60J 10/235 296/93 |
| 8,561,353 B2 * | 10/2013 | Terai | ............... | B60J 1/007 49/440 |
| 8,561,354 B2 * | 10/2013 | Grudzinski | ............ | E05F 11/382 49/502 |
| 8,572,898 B2 * | 11/2013 | Grudzinski | ............. | B60J 5/0402 49/441 |
| 8,650,802 B2 * | 2/2014 | Grudzinski | ............. | B60J 5/0402 49/441 |
| 9,597,949 B2 * | 3/2017 | Nojiri | ............... | B60J 10/76 |
| 9,694,659 B2 * | 7/2017 | Timmermann | .......... | B60J 10/70 |
| 9,925,850 B2 * | 3/2018 | Yoshida | .......... | B60J 1/004 |
| 9,944,159 B2 * | 4/2018 | Dosaki | .......... | B60J 10/76 |
| 10,167,659 B2 * | 1/2019 | Sagisaka | .......... | B60J 1/17 |
| 10,427,511 B2 * | 10/2019 | Blottiau | .......... | B60J 10/17 |
| 10,442,281 B2 * | 10/2019 | Krause | .......... | B60J 10/27 |
| 10,479,173 B2 * | 11/2019 | Krause | .......... | B60J 10/76 |
| 2004/0083654 A1 | 5/2004 | Yamamoto et al. | | |
| 2006/0021282 A1* | 2/2006 | Tamaoki | ............... | B60J 10/74 49/441 |
| 2006/0037249 A1* | 2/2006 | Kawamura | ............... | B60J 10/74 49/414 |
| 2007/0261313 A1 | 11/2007 | Ruppert et al. | | |
| 2009/0309391 A1* | 12/2009 | Krause | ............... | B60J 10/79 296/201 |
| 2012/0025564 A1 | 2/2012 | Ellis et al. | | |
| 2013/0061526 A1* | 3/2013 | Grudzinski | ............ | B60J 1/17 49/258 |
| 2013/0276372 A1 | 10/2013 | Lopez et al. | | |

FOREIGN PATENT DOCUMENTS

| | | |
|---|---|---|
| DE | 2551450 A1 | 5/1977 |
| DE | 3500791 A1 | 7/1985 |
| DE | 4026215 A1 | 2/1992 |
| DE | 4437532 A1 | 4/1996 |
| DE | 19744810 A1 | 4/1999 |
| DE | 19826040 A1 | 9/1999 |
| DE | 19962988 A1 | 5/2000 |
| DE | 10254989 A1 | 6/2004 |
| DE | 102005052945 B3 | 4/2007 |
| DE | 20 2011 050 329 U1 | 10/2012 |
| DE | 10 2012 214 508 A1 | 3/2013 |
| EP | 0021069 B1 | 1/1981 |
| EP | 0068367 B1 | 1/1983 |
| EP | 0087879 B1 | 9/1983 |
| EP | 0354 082 A1 | 2/1990 |
| EP | 0369798 B1 | 5/1990 |
| EP | 0479 522 B1 | 4/1992 |
| EP | 0 512 673 B1 | 11/1992 |
| EP | 1 794 402 B1 | 6/2007 |
| EP | 1816017 A1 | 8/2007 |
| EP | 2 142 394 | 1/2010 |
| FR | 2 604 660 A1 | 4/1988 |
| FR | 2747345 A1 | 10/1997 |
| FR | 3021254 A1 | 11/2015 |
| GB | 1536909 | 12/1978 |
| GB | 2 316 431 A | 2/1998 |
| JP | 59-199319 | 11/1984 |
| JP | S59206220 A | 11/1984 |
| JP | 61-169317 | 7/1986 |
| JP | 63-15218 | 2/1988 |
| JP | 10-61308 | 3/1998 |
| JP | 2000-38875 A | 2/2000 |
| JP | 2004036211 A | 2/2004 |
| JP | 2008-149849 A | 7/2008 |
| JP | 2014-234040 | 12/2014 |

(56) References Cited

FOREIGN PATENT DOCUMENTS

| | | |
|---|---|---|
| JP | 2016-048017 A | 4/2016 |
| WO | WO 2008/055982 A1 | 5/2008 |
| WO | WO 2014/191812 A1 | 12/2014 |

OTHER PUBLICATIONS

CN First Office action dated May 8, 2019 issued in Chinese corresponding Application No. 201780007613, 10 pages, with English translation, 5 pages.
European Examination Report dated Sep. 11, 2019 issued in corresponding EP Application No. 17 701 442.0-1005, 5 pages, with English translation, 2 pages.
Japanese Notification of Reasons for Rejection dated Jul. 2, 2019 issued in corresponding JP Application No. 2018-524470, 5 pages, with English translation, 4 pages.
Japanese Notification of Reasons for Rejection dated Jul. 30, 2019 issued in corresponding JP Application No. 2018-536864, 5 pages, with English translation, 4 pages.

\* cited by examiner

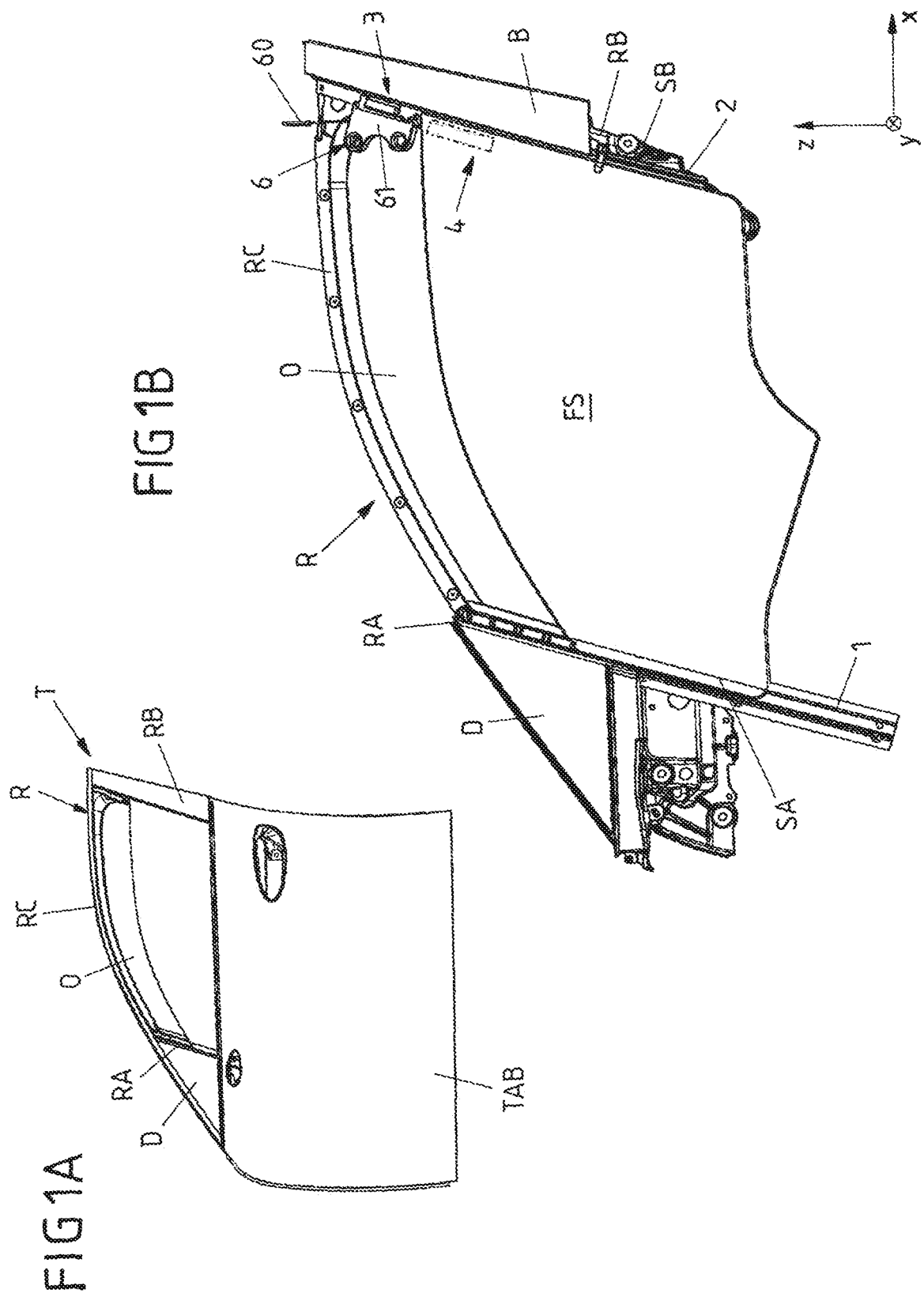

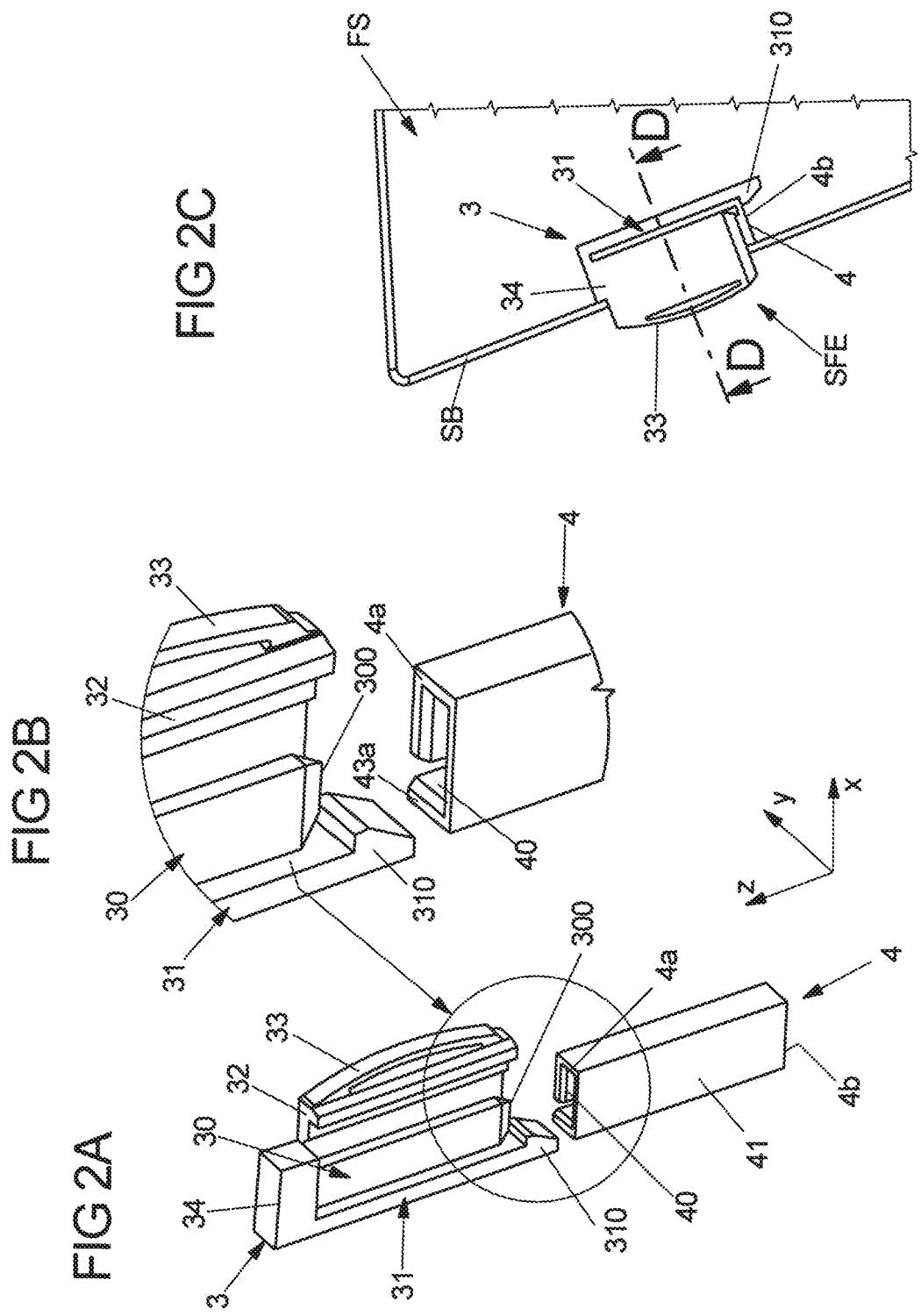

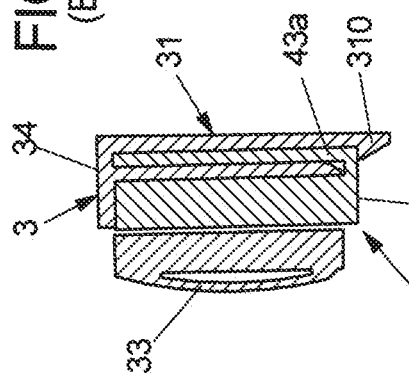
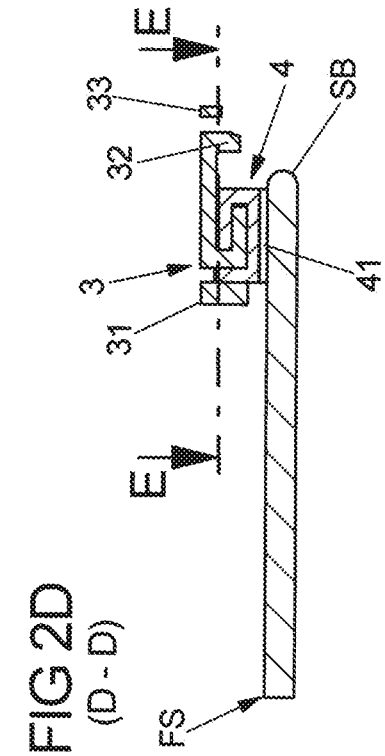
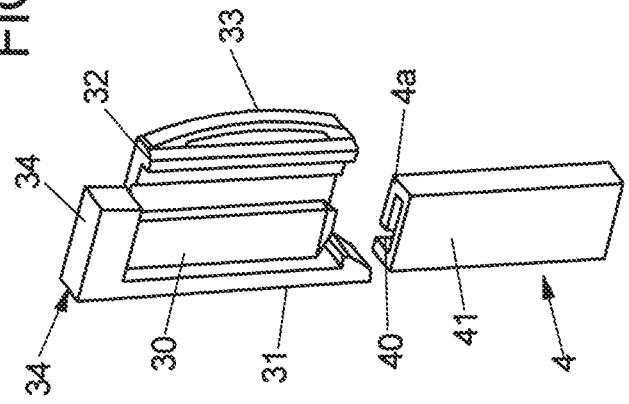
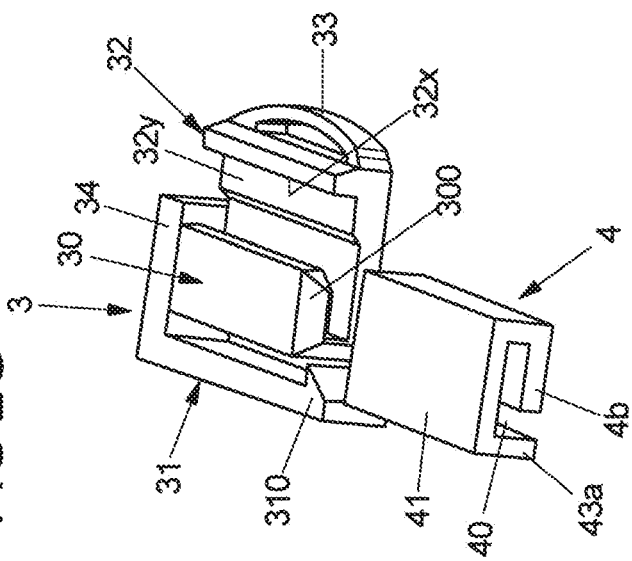
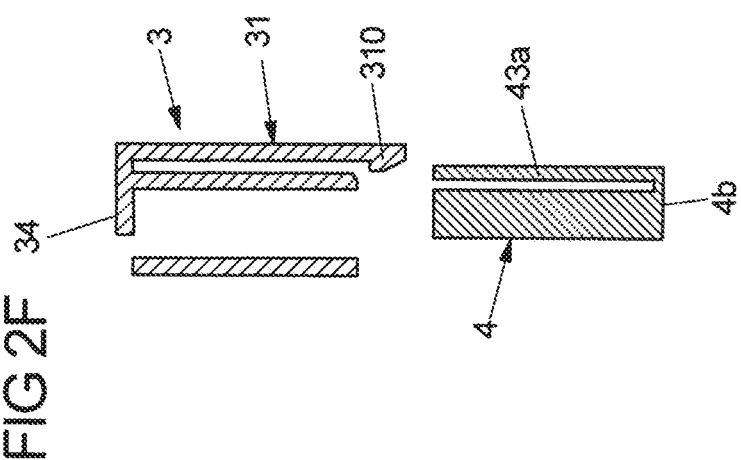

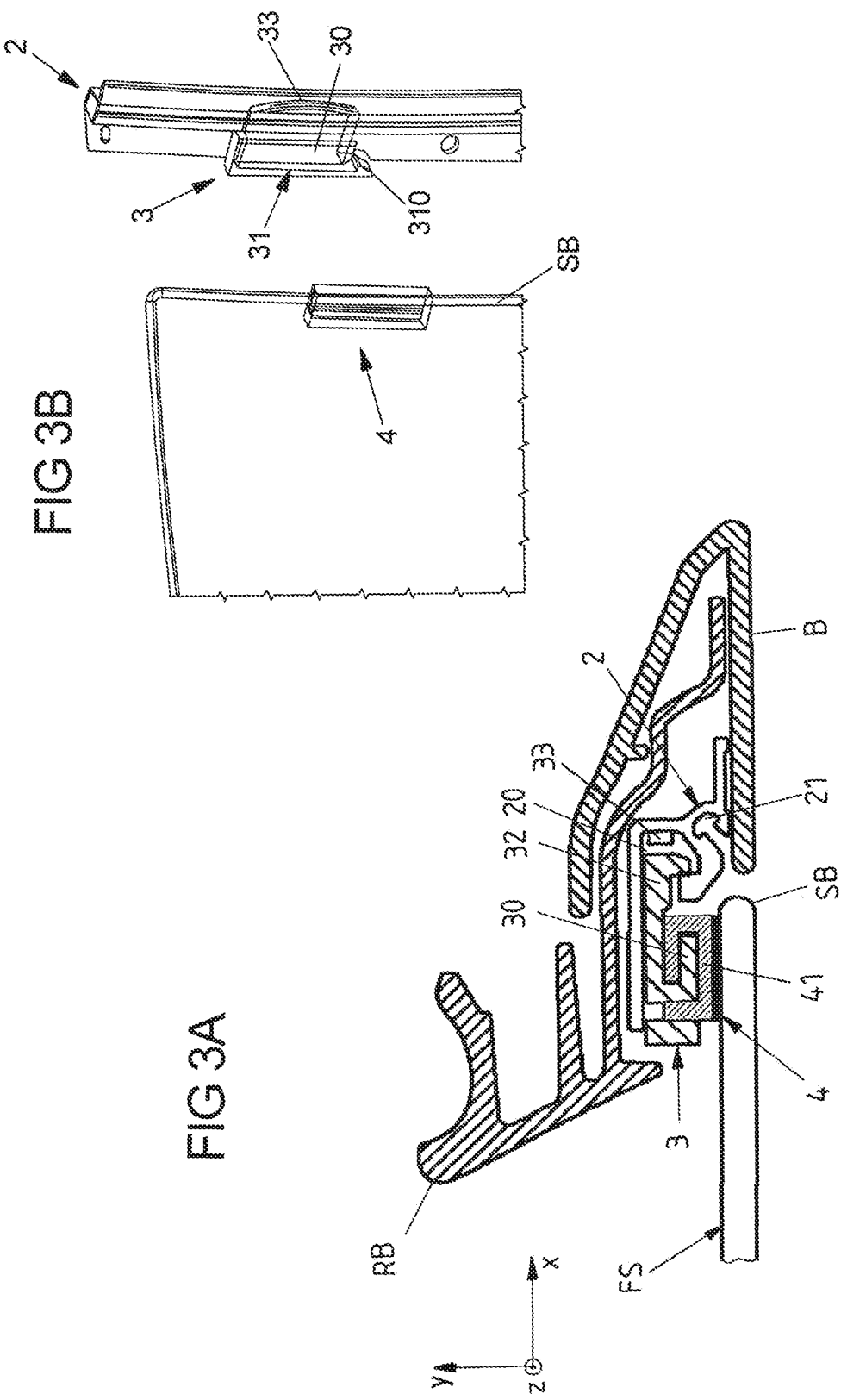

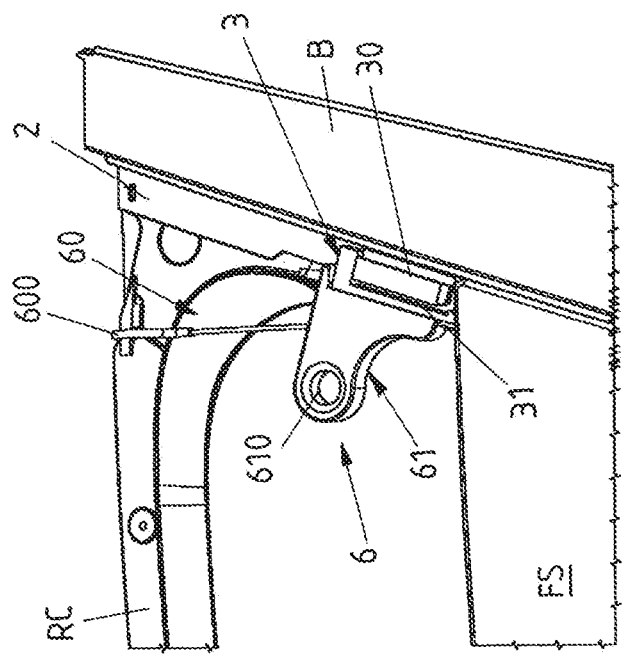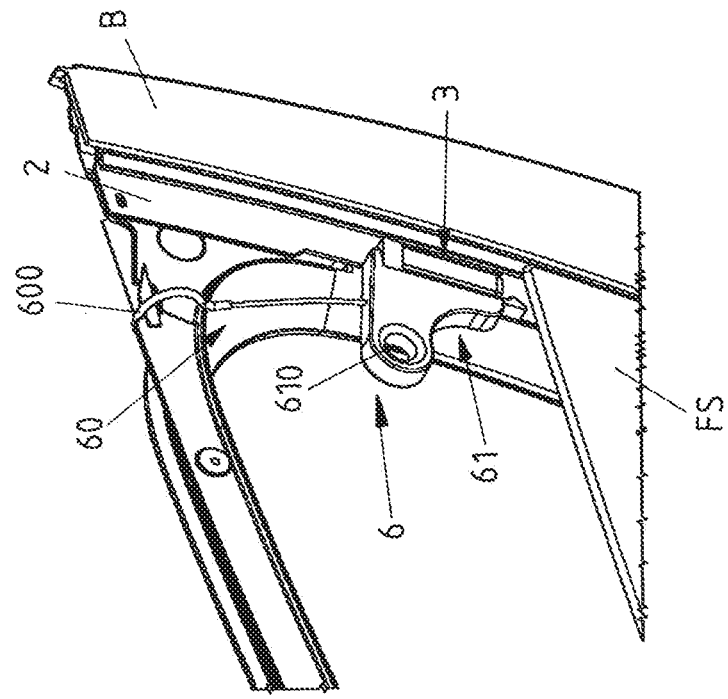

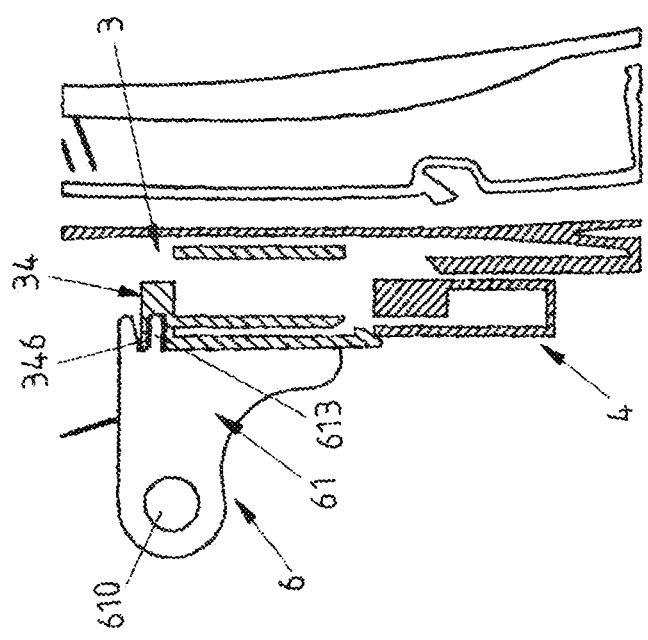
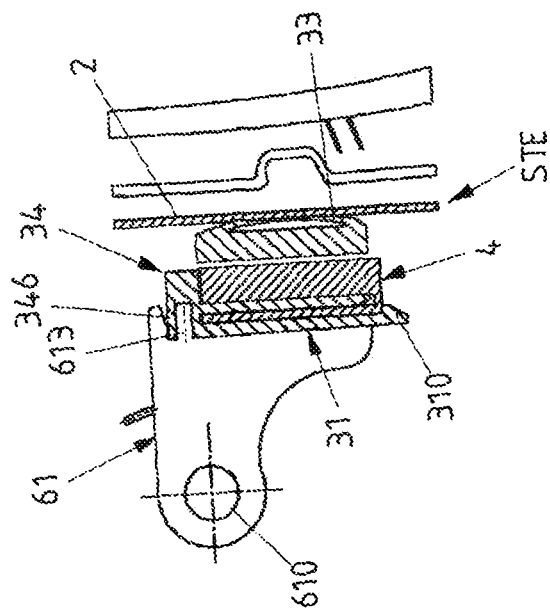

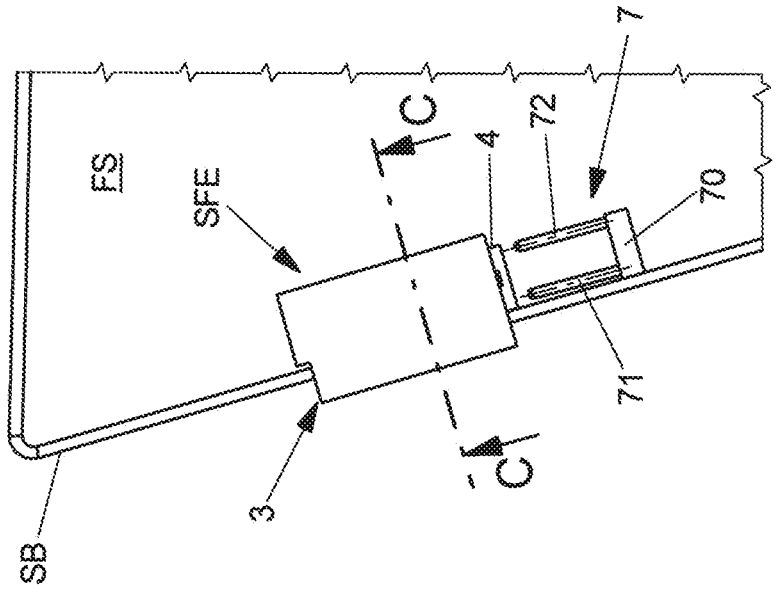
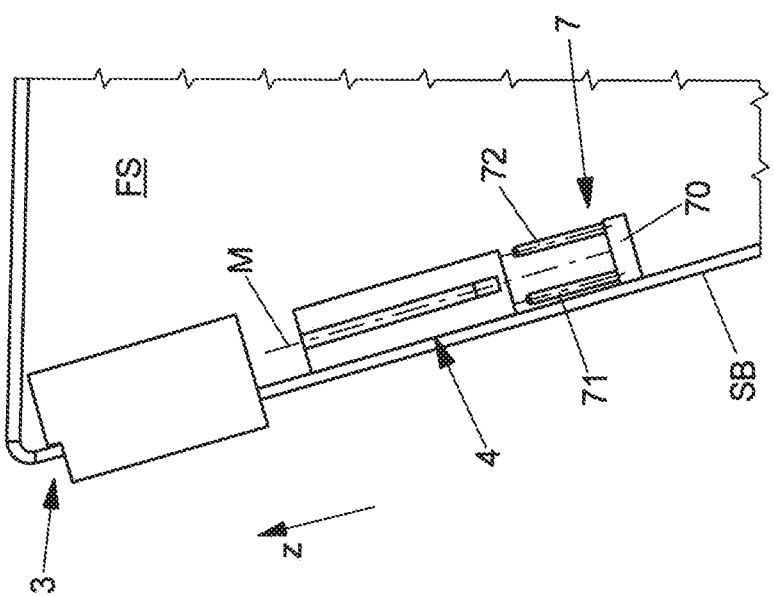

(C - C)

(D - D)

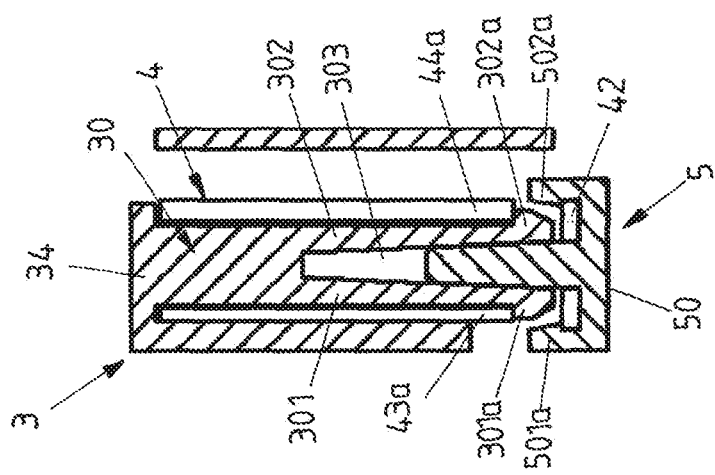
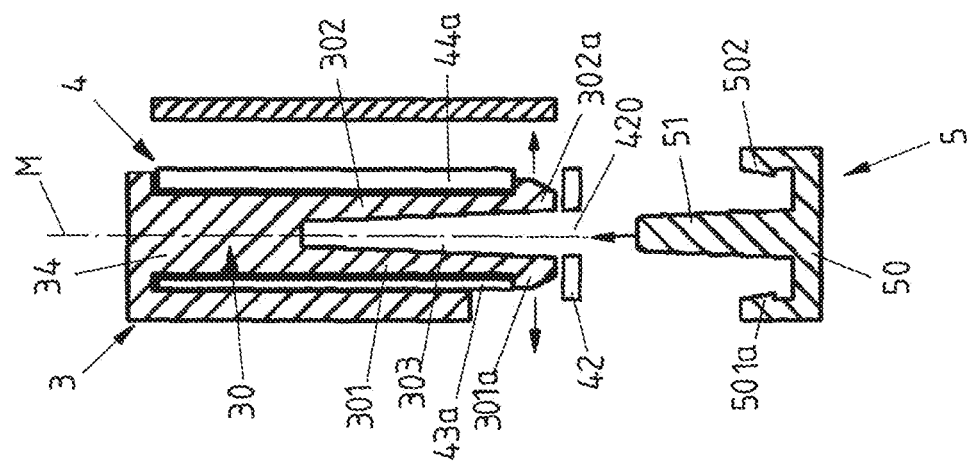
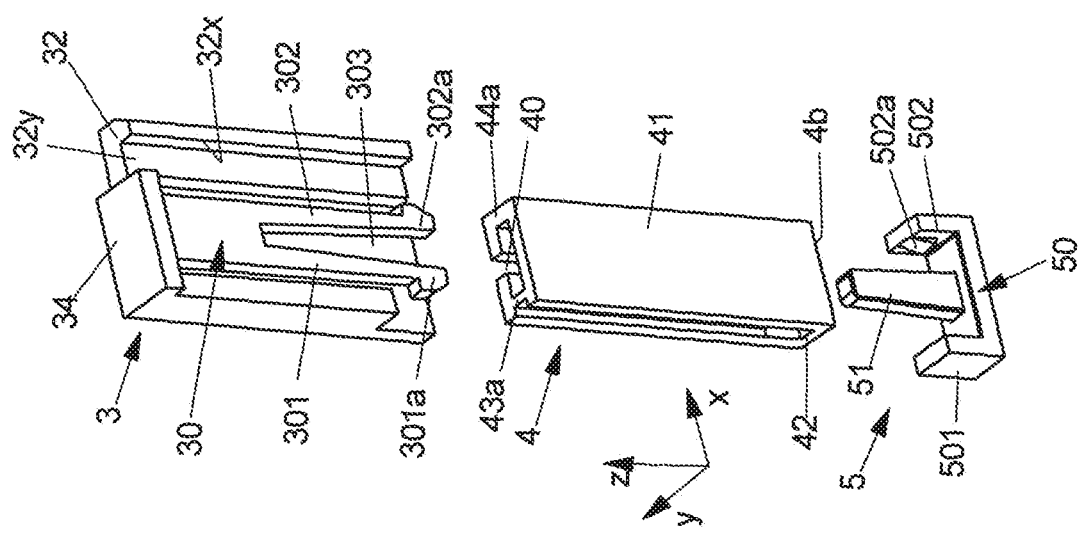

(C-C)

(D-D)

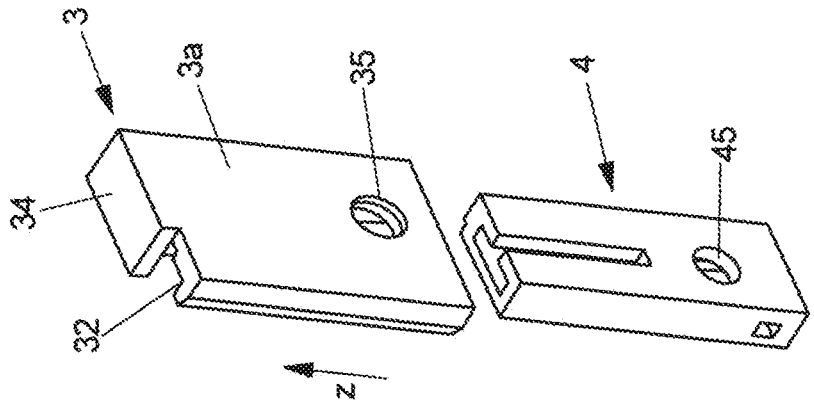
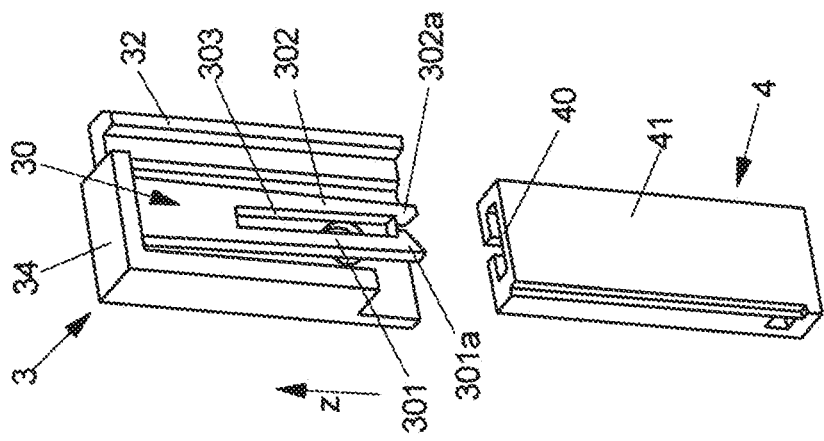
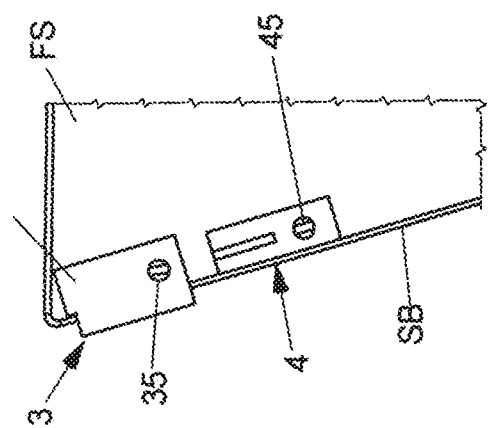
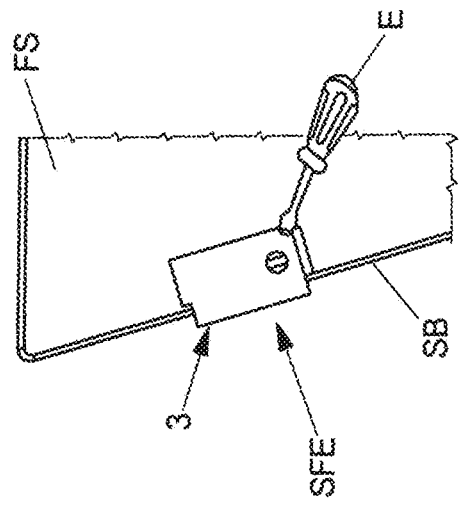

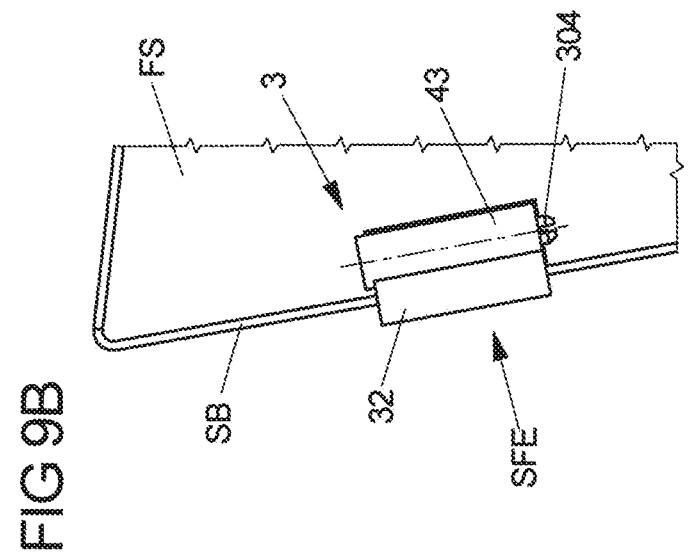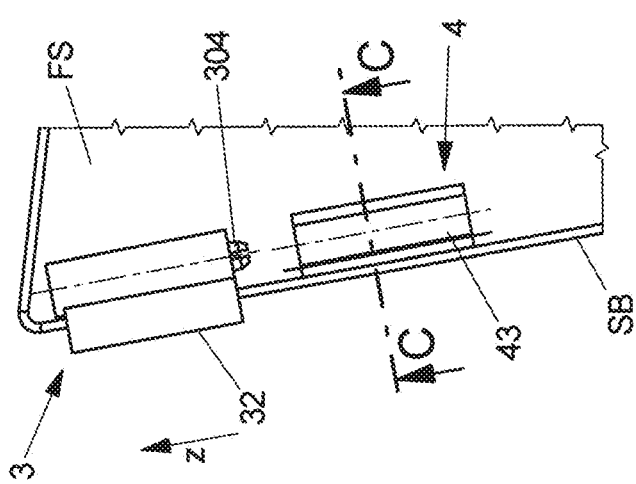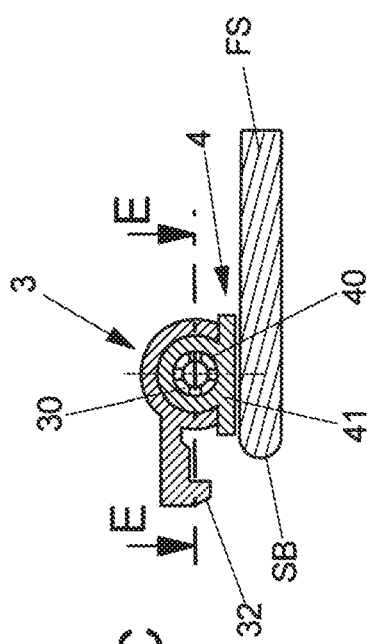

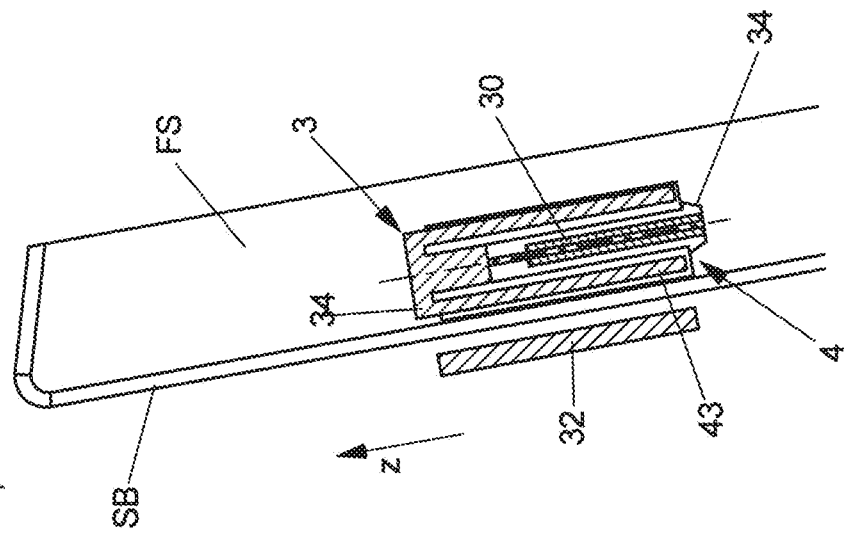
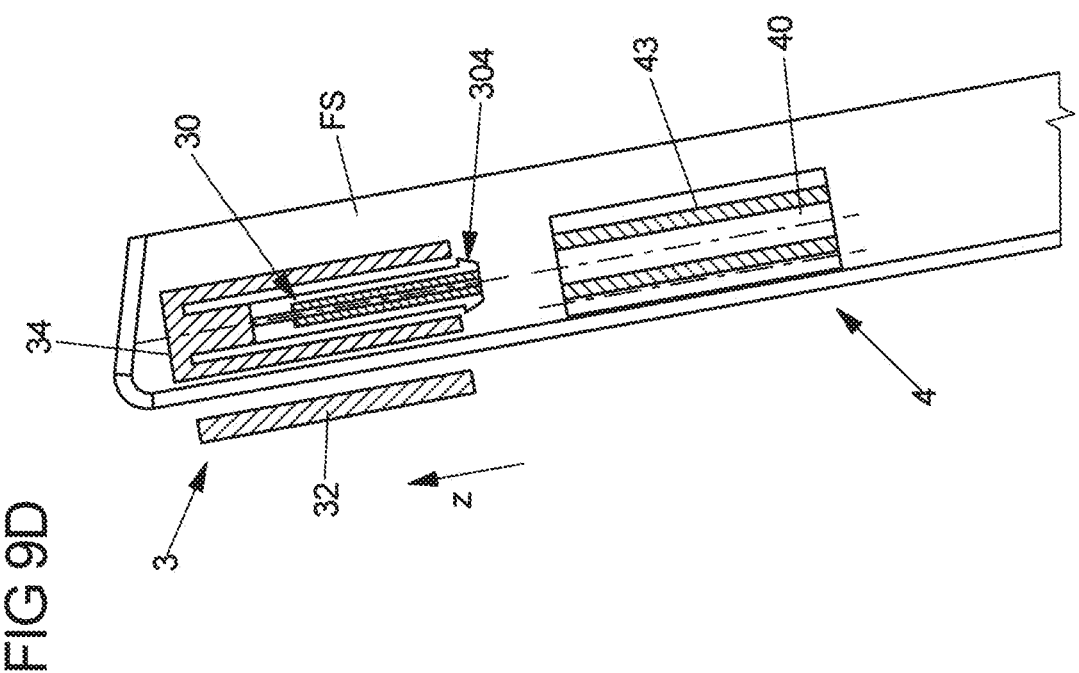

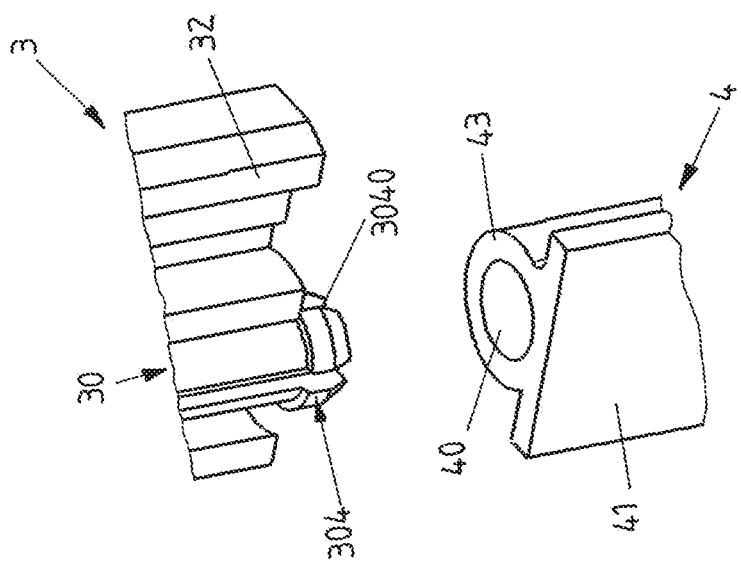
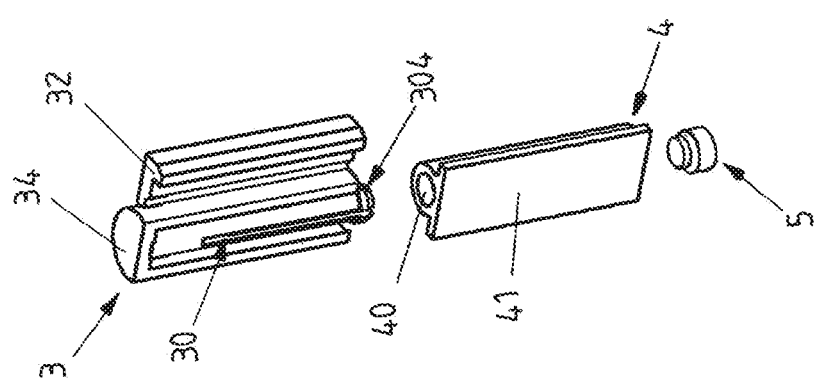

WINDOW LIFTER ASSEMBLY WITH MULTIPART PANE GUIDE ELEMENT FOR A FLUSH PANE DESIGN, AND ASSEMBLY METHOD

CROSS-REFERENCE TO A RELATED APPLICATION

This application is a National Phase Patent Application of International Patent Application Number PCT/EP2017/050913, filed on Jan. 18, 2017, which claims priority to and the benefit of German Patent Application Number 10,2016/201,106.5, filed on Jan. 26, 2016, the contents of all of which are incorporated herein by reference.

BACKGROUND

The invention relates in particular to a window lifter assembly and to a method for assembling a window lifter assembly.

Window lifter assemblies comprising a window pane which is adjustable along an adjustment path and extends along an (optionally curved) pane plane are extensively known for vehicle window lifters. In a closed state, a window opening inside a vehicle door or, in the case of a rear side pane, a body-side window opening, is closed here via the window pane. In recent years, at least in luxury vehicles, what are referred to as flush pane designs ("flush glass" or "flush glazing") have enjoyed increasing popularity. In this case, the window pane in its closed position is flush with upper and/or lateral body parts which border a window opening which is to be closed by the window pane. The window pane, when it is fully closed, is therefore not set back in relation to the body parts surrounding it, when viewed on its outer side. Instead, the impression of a continuously extending flat pane and body surface is produced on the vehicle side. For example, such a flush pane design is described in DE 35 00 791 A1. In more recent times, a flush pane design has been used, for example, in the Porsche Panamera.

For guiding the, in pane designs of this type a pane guide element is fixed on a front and rear lateral edge of the window pane. Such a pane guide element is then in each case guided displaceably along the adjustment path on another body-side or door-side guide element, which is customarily designed as a guide profile. The pane guide elements fixed on the window pane are regularly referred to here as "pin guides". However, the assembly of a window pane of this type has been comparatively complicated up to now. The pane regularly has to be pushed from below into a guide channel of a body-side or door-side guide profile, i.e., for example, from below a window sill of a vehicle door. Such an assembly then also, however, requires a specific door design, in which either a door outer skin is subsequently fitted, or a door frame module which is able to be fitted complete, consisting of a door carrier, window frame and pane fitted thereon, is provided and is subsequently connected to the remaining components of the vehicle door, in particular a door inner skin and a door outer skin.

SUMMARY

It is therefore an object of the invention to provide a window lifter assembly which permits a simplified assembly in the case of vehicle window lifters for a flush pane design (what is referred to as "flush glass" or "flush glazing" design).

This object is achieved both by a window lifter assembly with features as described herein and by an assembly method with features as described herein.

According to the invention, a window lifter assembly is provided, comprising an adjustable window pane for a vehicle window lifter, in which the window pane in a closed state is flush with upper and/or lateral body parts which border a window opening, to be closed by the window pane, in a window frame. The window lifter assembly here comprises at least one pane guide element which is fixed on the window pane in the region of a (front or rear) lateral pane edge, and at least one frame-side guide element at which the pane guide element is held displaceably on the window opening. According to the invention, the at least one pane guide element is of multi-part design with at least one first guide part and a second guide part, wherein
  the first guide part forms a guide portion via which the pane guide element is held displaceably on the frame-side guide element,
  the second guide part forms a connecting portion via which the pane guide element is fixed on the window pane, and
  the first guide part and the second guide part are designed as components which are separate from each other, wherein the second guide part is fixable on the window pane independently of the first guide part, and the first guide part is positionable displaceably on the frame-side guide element independently of the second guide part before the pane guide element is assembled as intended.

By means of the multipart design of the pane guide element, the window pane assembly is considerably more flexible and made easier. In particular, in the case of a flush pane design, it enables use to be made of a conventional door arrangement without a door outer skin to be subsequently fitted onto a door box having to be provided here. The solution according to the invention is also not specified for specific design principles for a vehicle door, for example for vehicle doors with a window frame integrated above a sill. Therefore, with the solution according to the invention, a multipart (at least two-part) pane guide element is provided—also referred to as a "pin guide" element in the case of a flush pane design, which permits cost-effective assembly of the window pane ending flush with upper and/or lateral body parts in the closed state.

With the solution according to the invention, it is not compulsory, even in the case of a flush pane design, for the window pane to have to be pushed from below the sill, i.e. in the region of the door box, into frame-side guide elements. Instead, the separate first guide element can be pushed in, inserted and/or screwed in from above or from the side independently of the window pane onto a frame-side guide element, for example into a guide channel of a corresponding guide profile. In a variant, the window pane is then only subsequently inserted from above the sill into the door well of the vehicle door, which is conventionally produced with two shells, and fixed on the already prefitted first guide part via the second guide part, which is fixed on the window pane, of the pane guide element.

The first guide part can therefore be arranged displaceably on a lateral frame-side guide element, in principle initially without connection to the window pane, before subsequently a connection takes place to the second guide part of the pane guide element, which enables the connection to the window pane. It is not compulsory here for the second guide part to actually already be fixed on the window pane when the pane guide element is assembled. In principle, the second guide part can also be fixed on the window pane subsequently, i.e. after connection of the first and second guide parts to each other. However, over the course of a rapid and uncomplicated assembly, a previous fastening of the second guide part to the window pane is generally preferred, and therefore the second guide part is already fixed on the window pane when the pane guide element is assembled. However, the effect achieved here with the solution according to the invention is that the window pane no longer has to be threaded on at least one frame-side guide element with its second guide part, but rather a connection to the first guide part, which is already (pre-)positioned on the frame-side guide element, merely has to be produced.

The first guide part which is to be positioned displaceably on the frame-side guide element, and the second guide part, which is to be fixed on the window pane, of the multi-part pane guide element can each have a mechanical intersection for connecting the first and second guide parts to each other. Both the first and the second guide part therefore have a mechanical intersection which is configured and designed to enable a connection to the respective other part.

In an alternative variant embodiment, the first and second guide part each have a mechanical intersection for connecting to at least one coupling part of the pane guide element, via which a connection is provided between the first guide part and the second guide part. In this variant, the pane guide element is therefore at least in 3 parts. The first and second guide parts are therefore connected to each other via at least one coupling part. The separate coupling part can already be arranged here on one or other guide part in the manner of an adapter before the connection to the respective other guide part takes place.

In one exemplary embodiment, the first guide part which is to be positioned displaceably on the frame-side guide element and the second guide part which is to be fixed on the window pane are connectable to each other, specifically by one of the guide parts being displaced along a portion of the other guide part. In this exemplary embodiment, an assembly of the pane guide element therefore takes place in such a manner that, for example, one of the guide parts slides along the other guide part in order to take up a predetermined relative position to the other guide part, in which the two guide parts are locked relative to each other. For example, one of the guide elements can be at least partially pushed here into the other guide part.

In a possible development, the window pane is to be raised and lowered along an adjustment axis in order to close or to open up the window opening, and the first guide part and the second guide part are connectable to each other by a relative movement of the guide parts taking place along said adjustment axis of the window pane. For example, the connection of the first and second guide parts to each other takes place by the first guide part which is already held displaceably on the frame-side guide element being pushed along the adjustment axis in the direction of the second guide part, and/or the second guide part which is already fixed on the window pane being pushed with the window pane along the adjustment axis in the direction of the first guide part.

Displacement of the second guide part can take place here, in particular in a power-operated manner, with the aid of the window lifter which is already coupled to the window pane. The window pane here is then customarily already guided displaceably on one of two frame-side guide elements lying opposite on the window opening before, by adjustment of the window pane and of the second guide part fixed thereon, an approach toward the pre-positioned first guide part, which is optionally locked in a preassembly position, takes place. A variant embodiment considered advantageous alternatively or additionally makes provision for the first guide part to first of all be locked in a predetermined preassembly position on the frame-side guide element, then positioning of the window pane with the second guide part already fixed thereon to take place such that the window opening is only partially closed by the window pane, and subsequently for the pane guide element to be installed as intended by the first guide part being pushed along the frame-side guide element in engagement with the second guide part while the window pane and the second guide part which is fixed thereon are held in a taken-up position, for example by means of the vehicle window lifter.

To shorten the assembly time, the first guide part and the second guide part can be pluggable onto each other. Accordingly, when a coupling part is used, it can also be provided that at least one of the two first and second guide parts or both guide parts can be plugged onto a coupling part. The guide parts and/or the guide parts and a coupling part are therefore to be fixed on one another via at least one plug-in connection in order to assemble the pane guide element as intended.

In a variant embodiment of a window lifter assembly according to the invention, in the assembled state of the pane guide element, at least one portion of a first or second guide part is received in the other, second or first, guide part. For example, it can be provided in this connection that an elongate, optionally pin-shaped insertion portion on one of the guide parts is pushed into a, for example, channel-shaped receptacle of the other guide part in order to assemble the pane guide element and to fix the window pane displaceably in the region of a front or rear lateral pane edge on the (front or rear) frame-side guide element.

The frame-side guide element can in principle be a guide profile with a guide channel which is formed on a window frame of a vehicle door body. However, it can also be a separate guide strip which is attached to a (lateral) frame part of such a window frame.

To facilitate the assembly, the first guide part can have an intersection for a positioning aid of the window lifter assembly, which positioning aid is to be connected to the first guide part, wherein the first guide part is held in a preassembly position on the frame-side guide element via the positioning aid before the pane guide element is assembled. Thus, with the use of the positioning aid, a certain preassembly position of the first guide part, which is already held displaceably on the frame-side guide element, can be predetermined. The positioning aid here predetermines, for example, a precisely defined preassembly position on the frame-side guide element and secures the first guide part in this preassembly position.

For this purpose, the positioning aid can comprise, for example, a holding part via which the positioning aid is connectable to a frame part of the window frame for assembly purposes. The positioning aid and the first guide part, which is connected thereto, are therefore temporarily held via the holding part in a certain preassembly position before, for example, a connection to the second guide part takes place.

In a variant embodiment based thereon, the holding part has, for example, a holding hook which can be hooked in on an upper frame part of the window frame in order to oppose a shifting of the first guide part along the frame-side guide element under the action of gravity.

In a variant embodiment, the first guide part has an intersection for a positioning aid of the window lifter assembly, which positioning aid is to be connected releasably to the first guide part, wherein the positioning aid comprises a handle, with the aid of which, during the assembly of the window lifter assembly, the first guide part, which is connected to the positioning aid, can be displaced manually along the frame-side guide element. The handle is therefore used during the assembly for easier manual displaceability of the first guide part such that a fitter, rather than being able to directly grasp the first guide part itself, can grasp the positioning aid handle which is designed in a corresponding manner for this purpose. Of course, a positioning aid equipped with such a handle can also be designed and provided for holding the first guide part in a preassembly position. For example, the first guide part is initially held in the preassembly position via the positioning aid and the holding part thereof. Subsequently, a connection of the holding part to a frame part of the window frame is released and the first guide part is displaced via the handle of the positioning aid in order to be brought into engagement with the second guide part and to assemble the pane guide element for guiding the window pane as intended.

In one variant embodiment, at least one of the first and second guide parts has at least one elastically shiftable locking portion which secures a form-fitting connection between the first and second guide parts or between a coupling part of the pane guide element and at least one of the first and second guide parts when the first and second guide parts take up a predetermined relative position to each other on the assembled pane guide element. The elastically shiftable locking portion can therefore be prestressed into a locking position in which the locking portion engages behind a portion of the respective other guide part and/or the coupling part and in such a manner secures an assembled state of the pane guide element.

For example, the at least one elastically shiftable locking portion of the first or second guide part is designed to automatically latch to a portion of the other, second or first, guide part and/or to a portion of the coupling part when the first and second guide parts take up the predetermined relative position to each other. A latching connection is therefore provided. In this case, for example, a locking portion designed as a locking hook or as a latching lug snaps into a latching opening or into a latching gap such that a portion of the respective other guide part and/or of the coupling part is gripped behind via said locking portion.

In order, for assembly and maintenance purposes, to facilitate disassembly of the window lifter assembly and in particular to simplify the removal of a window pane from the window opening, it can be provided that a locking via the at least one locking portion can be released in a targeted manner with an unlocking element or an unlocking tool. For this purpose, for example, at least one unlocking opening is provided on at least one of the first and second guide parts via which unlocking opening, on the assembled pane guide element, a portion of an unlocking element or a portion of an unlocking tool can act on the first or second guide part in order to shift the locking portion and in order to be able to separate the first and second guide parts from each other and/or the coupling part from at least one of the first and second guide parts. The pane guide element is therefore designed with its first and second guide parts, for example, in such a manner that the unlocking element can be pushed with at least one portion into the interior of the pane guide element in order to release a latching connection provided via the at least one locking portion. For example, a hook-shaped locking portion can be brought out of engagement in a targeted manner here with a latching opening or a latching gap by means of the unlocking element or unlocking tool.

In particular in the case of guide parts which are pluggable onto each other and are latched to each other via at least one locking portion, the additional use of a securing element on the pane guide element is appropriate. The securing element here blocks the at least one elastically shiftable locking portion against shifting out of a latching portion in which the locking portion is latched to the other, second or first, guide part and/or to the coupling part. In an assembled state of the pane guide element, a corresponding securing element of the pane guide element is therefore in a securing position in which the securing element blocks a shifting of the at least one locking portion out of its latching position and therefore prevents separation of the first and second guide parts from each other. If the window pane is therefore mounted displaceably as intended on the frame-side guide element in the region of the assembled pane guide element, the parts of the pane guide element can no longer be readily released from one another. Consequently, the securing element serves as an (additional) securing of the assembled state.

For this purpose, the securing element can comprise, for example, a securing portion which is conical in one variant and which, inserted into an opening or a channel, which is bordered by the locking portion, blocks the locking portion against shifting. For example, shifting of the locking portion out of its latching position in the direction of an opening or channel center can be blocked here via the securing portion inserted into the opening or the channel.

The securing element can be mounted adjustably on one of the first or second guide parts or a coupling part for example via a joint, in particular a hinge joint, such as, for example, a film hinge. In one variant, the securing element can be adjustable between at least one assembly position and a securing position. In the assembly position of the securing element, for example, the plugging of the guide parts onto one another is permitted. In the securing position, the securing element then acts on the at least one locking portion and blocks the latter against shifting out of an automatically taken-up latching position. In one refinement, the securing element is formed integrally with a first or second guide part or with the coupling part. In the case of an integral design of the guide part and securing element, for example, a film hinge is formed on a guide part for the adjustability of the securing element.

In an alternative variant embodiment, the securing element is designed as a separate component which is connectable to at least one of the guide parts and/or to a coupling part after the at least one locking portion has taken up its latching position. The securing element therefore forms a further separate component of the multi-part pane guide element.

In one exemplary embodiment, via the assembled pane guide element, physical guidance of the window pane is provided on the frame-side guide element both along a first transverse direction, which extends substantially parallel to a pane plane defined by the window pane (and preferably also transversely with respect to the adjustment axis of the window pane here), and also along a second transverse direction, which extends substantially perpendicularly to the pane plane. In one variant embodiment, such a pane guide element of multi-part design is arranged on a vehicle door only in the region of one of two frame-side guide elements lying opposite on the window opening above the sill. In the case of flush pane concepts, in order to permit compensation for tolerances, physical guidance along both possible transverse directions perpendicularly to the adjustment axis of the window is customarily provided via a pane guide element only in the region of a (front or rear) lateral pane edge, while only guidance along a transverse direction perpendicular to the pane plane takes place on the opposite (rear or front) lateral pane edge. For example, a pane guide element configured according to the invention on a window opening of a vehicle door is provided on the lateral pane edge of the window pane that is in the vicinity of the B pillar. However, this does not, of course, rule out the fact that in each case at least one pane guide element of multi-part design according to the invention is provided on the two opposite lateral pane edges.

A spring element for elastically supporting the pane guide element on the frame-side guide element can be provided on the first first guide part formed with the guide portion. An elastic support substantially perpendicular to the adjustment axis of the window pane is achieved here via the spring element in order to compensate for tolerances and to avoid rattling noises during operation of the vehicle window lifter. For example, a corresponding spring element can be formed on the first guide part by a spring bow which lies against a wall of the frame-side guide element and is at least slightly loaded counter to a prestressing force when the pane guide element is assembled as intended and is held displaceably on the frame-side guide element.

A further aspect of the invention is the provision of an improved method for assembling a window lifter assembly.

An assembly method according to the invention is suitable here in particular for assembling a window lifter assembly configured according to the invention, and therefore advantages and features explained above and below of variant embodiments of a window lifter assembly according to the invention also apply to variant embodiments of an assembly method according to the invention, and vice versa.

An assembly method according to the invention is basically distinguished here in that, in the case of a pane guide element of multipart design, a first guide part forms a guide portion of the pane guide element in order to hold the pane guide element displaceably on a lateral frame-side guide element of a window frame, and in that the first guide part is (pre-)positioned displaceably on the frame-side guide element via the guide portion. Furthermore, for the connection of the pane guide element to the window pane, a second guide part of the pane guide element forms a connecting portion via which the second guide part is fixed on the window pane independently of the first guide part. According to the invention, the pane guide element is assembled with the first and second guide parts only after the first guide part has been defined on the frame-side guide element and after the second guide part has been fixed independently thereof on the window pane. The first and second guide part are therefore arranged as separate components, and not yet connected to each other, firstly on the window pane and secondly on the frame-side guide element and are only subsequently connected to each other, optionally with the use of an additional coupling part of the pane guide element.

For the assembly of the pane guide element, the first guide part, which is positioned on the frame-side guide element, and the second guide part, which is fixed on the window pane, can also be connected directly to each other, in particular by the two guide parts being latched to each other.

In order to secure a predetermined relative position of the first and second guide parts with respect to each other, at least one portion of a securing element of the pane guide element can be inserted into an opening or a channel of the first or second guide part, in particular after the window pane has been fitted as intended. For example, the shifting of a locking portion can be secured here via the securing element, and therefore an unintentional release of a spring-elastic clip connection, provided via at least one such locking portion, can be opposed.

BRIEF DESCRIPTION OF THE DRAWINGS

Possible variant embodiments of the solution according to the invention are illustrated in more detail with reference to the attached figures.

FIG. 1A shows, in a side view, a vehicle door with a window lifter assembly configured according to the invention.

FIG. 1B shows, on an enlarged scale, details of the window lifter assembly during the assembly of the window pane and a first guide part, which is held in a preassembly position by means of a positioning aid, of a rear pane guide element of two-part design.

FIGS. 2A-2H show details of the pane guide element of the window lifter assembly of FIGS. 1A and 1B in different views and firstly in a non-assembled state (FIGS. 2A, 2B, 2F, 2G and 2H) and in an assembled state (FIGS. 2C, 2D and 2E).

FIG. 3A shows a sectional illustration of the fitted window pane in the region of the pane guide element which is of two-part design and is assembled as intended.

FIG. 3B shows the window pane with a second guide part, which is fixed thereon, of the pane guide element and, separately therefrom, the first guide part, which is already positioned on a frame-side guide element of the window lifter assembly, of the pane guide element.

FIGS. 4A-4D show, in various views, details of a positioning aid of the window lifter assembly, via which the first guide part of the pane guide element is held in a preassembly position until the assembly of the window pane on a window frame of the vehicle door, and via which the first guide part is subsequently displaceable manually in engagement with the second guide part, which is fixed on the window pane, of the pane guide element.

FIGS. 5A to 5F show, in various views, a further variant embodiment of a two-part pane guide element, in which a latching connection between the two guide parts is releasable via a separate unlocking element.

FIGS. 6A-6C show, in various views and phases during the assembly, an exemplary embodiment of a 3-part pane guide element which has, as one part, a securing element which can be plugged separately onto the two guide parts which are latched to each other.

FIGS. 8A-8F show, in various views and phases during assembly and disassembly, a further exemplary embodiment of a two-part pane guide element, in which a latching connection between two guide parts is releasable by rotating an unlocking tool.

FIGS. 9A-9G show, in various views and phases during the assembly, a 3-part pane guide element, in which the second guide part, which is fixed on the window pane, forms a circular-cylindrical sleeve portion for receiving a circular-cylindrical and multi-slotted insertion portion of the first guide part, and in which, in order to secure the first and second guide parts which are latched to each other, a separate securing element is provided with is plugged into the insertion portion of the first guide part.

DETAILED DESCRIPTION

Figure 5C:
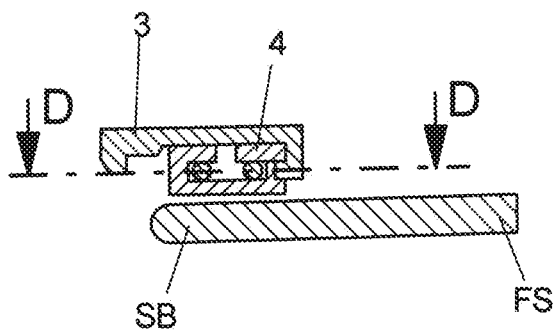

FIGS. 1A to 4D show, in various views and scales, a first exemplary embodiment of a window lifter assembly according to the invention for a vehicle door T, comprising a window pane FS which is adjustable manually by means of a window lifter or in a power-operated manner and which, in a closed state, ends flush with upper and/or lateral body parts and is therefore part of what is referred to as a flush pane design (consequently of what is referred to as a "flush glass" or "flush glazing" design). If the window pane FS is completely closed, it is adjoined in a flush manner both by a panel B on a rear, lateral frame part RB (with respect to the vehicle longitudinal axis) of a window frame R of the vehicle door T and, on the opposite side, by a mirror triangle D of the vehicle door T. When the vehicle doors are closed, the upper side in the region of an upper frame part RC of the window frame R, which is also referred to as the upper door frame, is adjoined in a flush manner by a body part, and therefore the impression is conveyed of a continuously extending, flat pane and body surface on the vehicle side. In a maximally raised position, the window pane FS closes a window opening O, which is defined above a window sill of the vehicle door T, of the window frame R in the vehicle door T.

In the case of previously customary flush pane designs, the window pane FS regularly has to be pushed under the window sill region of the vehicle door T into lateral guide elements of the window frame R. In this case, pane guide elements are fixed on opposite lateral pane edges SA and SB of the window pane FS. Said pane guide elements are fixed on the inner side, facing the vehicle interior, of the window pane FS and are guided displaceably on the frame-side guide elements in the region of lateral frame parts RA and RB of the window frame R. For the pushing-in of the window pane FS with its pane guide elements fixed thereon, a door outer skin of the vehicle door T, here in the form of an outer door panel TAB, is customarily configured to be removable. After the assembly of the window pane FS, the outer door skin TAB can therefore be subsequently connected here to the door body of the vehicle door T. However, a complicated door design is associated therewith since a customary door design with a door frame pressed together in two-shell form and inner door skin and outer door skin fixed firmly to each other cannot be used.

In this respect, the solution according to the invention provides a remedy which is illustrated in a variant embodiment in FIG. 1B during the assembly of the window pane FS.

FIG. 1B shows the window frame R of the vehicle door T of FIG. 1A in an individual illustration. The window pane FS is already guided displaceably as intended in the region of its front pane edge SA on the front lateral frame part RA of the window frame R via a pane guide element (not illustrated here) on a first guide element 1, for example in the form of a guide strip. In order to enable the insertion of the pane FS here above the window sill, the window pane FS is guided on the rear lateral pane edge SB via a multi-part pane guide element SFE (compare in particular FIG. 2C) on a second guide element 2 of the rear lateral frame part RB when the window lifter assembly is fitted as intended.

In order to avoid here that the window pane FS has to be threaded from below into the second rear guide element 2 and into a guide channel formed thereon, the pane guide element SFE for the rear pane edge SB, which is arranged in the vicinity of the B pillar of the vehicle in the installed state, has two guide parts 3 and 4 which are to be connected to each other.

A first guide part 3 can be pre-positioned displaceably here on the second guide element 2 independently of a second guide part 4 and therefore separately. For the pre-positioning, a positioning aid 6 is provided which is explained in more detail below and holds the first guide part 3 in its pre-assembly position until the window pane FS has been arranged on the window frame R.

The second guide part 4 is provided for fixing on the inner side of the window pane FS in the vicinity of the rear pane edge SB. The second guide part 4 does not protrude here over the rear lateral pane edge SB, and therefore the window pane FS can be easily fitted to the window frame R in the region of the window opening O. If the window pane FS is arranged on the rear frame part RB, the first guide part 3 is displaced along the frame-side guide element 2 in the direction of the second guide part 4, which is fixed on the window pane FS, until the two guide parts 3 and 4 latch and the pane guide element SFE is assembled in such a manner.

The pane guide element SFE with its first and second guide parts 3 and 4 is shown in detail in various views with reference to FIGS. 2A to 2H.

The first guide part 3 to be pre-positioned on the frame-side guide element 2 has, inter alia, an elongate, pin-shaped insertion portion in the form of an insertion pin 30 which can be pushed into the sleeve-shaped second guide part 4. In order to facilitate the pushing of the insertion pin 30 here into a corresponding receiving channel 40 of the second guide part 4, the insertion pin 30 has, at its end pointing in the direction of the second guide part 4, an insertion cone 300 with beveled side surfaces. To facilitate the insertion of the insertion pin 30, the inner walls of the receiving channel 40 of the second guide part 4 also have beveling on an end side 4a, which faces the first guide part 3 (compare in particular the enlarged illustration of FIG. 2B).

Furthermore, a guide portion 32 is provided on the first guide part 3, said guide portion permitting engagement of the first guide part 3 in a guide channel 20 of the frame-side guide element 2, which is designed as a guide strip. Via the guide portion 32, in the state of the pane guide element SFE assembled as intended and when the window pane FS is fitted as intended via two guide surfaces 32$x$ and 32$y$ running substantially perpendicularly to each other, physical guidance of the window pane FS on the frame-side guide element 2 both along a first transverse direction X, which runs substantially parallel to the pane plane of the window pane FS and points rearward, and also along a second transverse direction Y, which runs substantially perpendicularly to the pane plane and points inward, is provided. Both directions X and Y run perpendicularly here to the adjustment axis, which is defined by the two guide elements 1 and 2, of the window pane FS, along which the window pane FS can be raised in a direction +Z and lowered in a direction −Z.

In the state of the pane guide element SFE assembled as intended, the guide portion 32 of the first guide part 3 protrudes over the rear lateral pane edge SB on the inner side of the window pane FS in X direction in order to be able to engage in the lateral guide channel 20. Furthermore, a spring element in the form of a spring bow 33 is formed on the guide portion 32. Via said spring bow 33, the first guide part 3—and therefore, in the assembled state, the pane guide element SFE—is supported along the transverse direction X on a wall of the guide channel 20. Via said spring-elastic support, rattling noises during operation are avoided, and tolerances can be compensated for transversely with respect to the adjustment axis.

In the present case, the first and second guide parts 3 and 4 are displaceable with respect to each other along the adjustment axis of the window pane FS and, when sufficiently close to each other, can be latched to each other. The first guide part 3 can be plugged here via its insertion pin 30 onto the second guide part 4. If the insertion pin 30 is pushed into the receiving channel 40 of the second guide part 4 to such an extent that the (upper) end side 4a, which faces the first guide part 3, of the second guide part strikes against an end body 34 of the first guide part 3, the two guide parts 3 and 4 are latched to each other via a locking portion in the form of a locking hook 310. In the state of the pane guide element SFE assembled as intended, said locking hook 310 engages behind a latching web 43a of the second guide part 4 on the (lower) end side 4b, which faces away from the first guide part 3, of the second guide part 4. The locking hook 310 is formed here on an elongate spring web 31 of the first guide part 3, which runs parallel to the insertion pin 30. Via the spring web 31, the locking hook 310 is prestressed into a latching position, and therefore the locking hook 310 automatically latches to the latching web 43a, which here forms an outer wall of the second guide part 4, of the second guide part 4, on the lower end side 4b of the latter, when the first guide part 3 has been plugged sufficiently far with its insertion pin 30 into the second guide part 4. The locking hook 310 then engages behind the lateral latching web 43a of the second guide part 4, and the two guide parts 3 and 4 are latched to each other as intended and are no longer readily releasable from each other.

A multi-part pane guide element SFE, accordingly a multi-part what is referred to as a "pin guide" element, is therefore provided via the two guide parts 3 and 4, the guide parts 3 and 4 of which element are only connected to each other after the one guide part 3 has been pre-positioned on the frame-side guide element 2 and the other guide part 4 has been fixed on the window pane FS. The second guide part 4, which is provided for fixing on the window pane FS, is fixed here extensively on the inner side of the window pane FS in the vicinity of the rear lateral pane edge SB via a connecting portion 41 by means of an adhesive bond.

The spatial arrangement of the two guide parts 3 and 4 is shown in more detail with reference to FIGS. 3A and 3B. It is thus apparent in particular from the sectional illustration of FIG. 3A how the second guide part 4, which is adhesively bonded to the window pane FS, does not protrude over the rear lateral pane edge SB, in order not to have to thread the window pane FS at the rear pane edge SB into the guide channel 20. The window pane FS can thus be easily plugged with one or more pane guide elements, provided on its front pane edge SA, along the direction—X into a guide channel of the front frame-side guide element 1. Only subsequently does subsequent fixing to the rear frame-side guide element 2 take place by the first guide part 3, which is already mounted displaceably thereon, being plugged onto the second guide part 4 and latched thereto. Subsequently or previously, a gap seal can also be provided on a sealing intersection 21 of the rear guide element 2.

In order to hold the first guide part 3 in a predetermined pre-assembly position on the rear guide element 2 after the first guide part 3 has been pushed, plugged or screwed via its guide portion 32 into the guide channel 20, it can be provided that the first guide part 3 is held in the preassembly position solely because of the frictional forces under the action of gravity. In order to increase the process reliability, a positioning aid 6 is provided here, the function of which is shown in more detail with reference to FIGS. 4A to 4D.

The first guide part 3 thus has, in the region of the end body 34, an intersection for the positioning aid 6 in the form of a plug-in opening 346. A plug-in pin 613 of the positioning aid 6 is plugged into said plug-in opening 346 transversely with respect to the adjustment axis of the window pane FS and therefore transversely with respect to the direction of extent of the insertion pin 30 of the first guide part 3. The positioning aid 6 is thus held in a positive locking manner on the first guide part 3. A holding part, here in the form of a holding rod or holding cable 60, extends from that portion of the positioning aid 6 which is plugged onto the first guide part 3. A holding hook 600 which can be hooked onto the upper frame part RC is provided at the end of said holding rod or holding cable 60. Consequently, the positioning aid 6 hangs via said holding hook on the upper frame part RC and prevents displacement of the first guide part 3, which engages in the guide channel 20, under the action of gravity. Owing to the positioning aid 3, the first guide part 3 is therefore held in a defined preassembly position in the vicinity of the upper frame part RC.

If the window pane FS with the second guide part 4, which is fixed thereon, of the pane guide element SFE is subsequently fitted onto the window frame R, the window pane FS is held in a partially open position—for example via the vehicle window lifter which already acts on the window pane FS and is preferably driven by electric motor. In order then to secure the window pane FS with its rear pane edge SB on the rear frame-side guide element 2, the positioning aid 6 is unhooked, and therefore the positioning aid 6 can be displaced together with the first guide part 3 downward in the direction −Z along the guide channel 20. In order to facilitate manual displacement of the first guide part 3 in the direction of the second guide part 4, which is fixed on the window pane FS, the positioning aid 6 forms a handle 61 with a gripping opening 610. The first guide part 3 is plugged via the latter onto the second guide part 3, and its insertion pin 30 is pushed into the receiving channel 40 of the second guide part 4 until the two guide parts 3 and 4 automatically latch to each other via the locking hook 310. Subsequently, the positioning aid 6 is removed from the first guide part 3. In the variant embodiment illustrated, the positioning aid 6 is therefore only temporarily releasably connected to the first guide part 3 for assembly purposes, in order to predetermine the preassembly position of the latter and, when the pane guide element SFE is assembled, to facilitate the displacement thereof along the rear guide element 2.

Alternatively to the illustrated variant embodiment with a positioning aid 6 hooked onto the upper frame part RC, said positioning aid can also be held, for example, on the lateral frame part RB or on the rear guide element 2. A variant provides, for example, a latching of a positioning aid on the guide channel 20 in order to secure the first guide part 3 in its preassembly position.

Figure 5D:
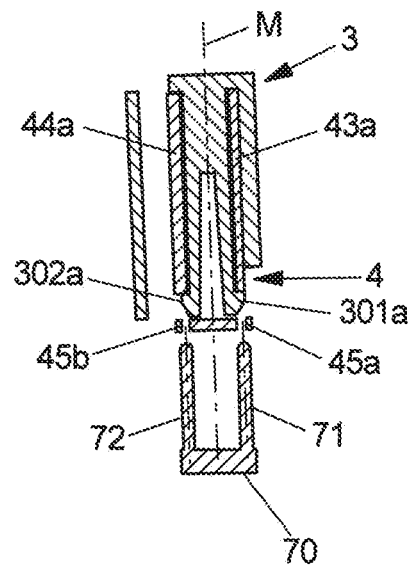
Figure 5E:
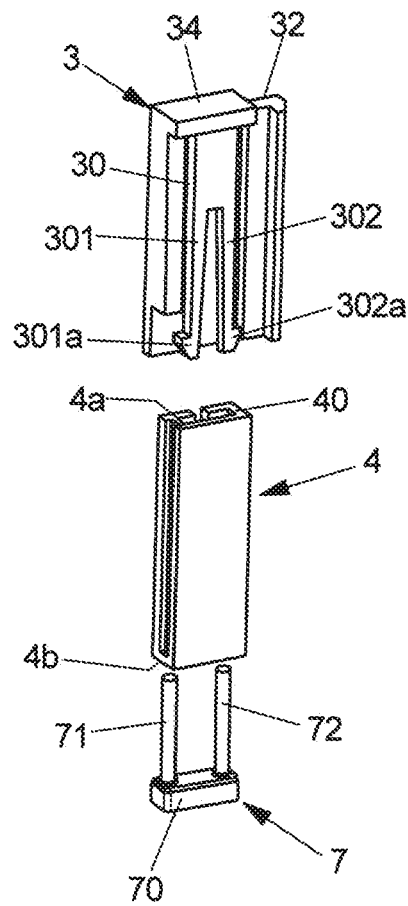
Figure 5F:
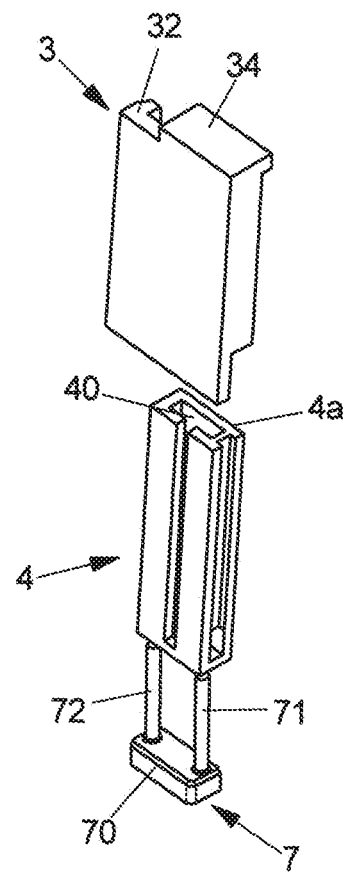

FIGS. 5A to 5F show a further variant embodiment of a pane guide element SFE, in which the first guide part 3, on its insertion pin 30, forms two spring webs 301 and 302 with locking hooks 301a and 302a. During the connection of the two guide parts 3 and 4, the spring webs 301 and 302 are therefore pushed into the receiving channel 40 of the second guide part 4. The locking hooks 301a and 302a formed at the end of the spring webs 301 and 302 are prestressed outward here in mutually opposed directions, and are therefore compressed within the receiving channel 40. If the first guide part 3 is pushed maximally into the second guide part 4 and therefore the two guide parts 3 and 4 are in a final relative position with respect to each other, the locking hooks 301a and 302a automatically latch with mutually opposite latching webs 43a and 44a of the second guide part 4 by snapping into latching openings of the second guide part 4, said latching openings each being formed in a lateral wall.

The locking hooks 301a and 302a, which are spread apart from each other, are therefore received on the assembled pane guide element SFE in the receiving channel 40 of the second guide part 4 and are therefore scarcely accessible, if at all, from outside the pane guide element SFE. In order in the case of such a latching connection between the two guide parts 3 and 4 to permit disassembly of the pane guide element SFE for maintenance or repair purposes, an unlocking element 7 which can be plugged onto the pane guide element SFE is provided.

Said unlocking element 7 is U-shaped in cross section and has, on a base 70, unlocking pins 71 and 72 which protrude vertically and preferably run parallel to each other. The unlocking element 7 is pushed with its unlocking pins 71 and 72 along a center line M of the assembled pane guide element SFE, which center line runs centrally between the two spring webs 301 and 302 of the first guide part 3, into the pane guide element SFE. The pushing-in direction of the unlocking pins 71 and 72 of the unlocking element 7 into the interior of the pane guide element SFE takes place here in the direction Z opposed to the pushing-in direction of the insertion pin 30 of the first guide part 3 into the receiving channel 40 of the second guide part 4. The unlocking pins 71 and 72 are pushed here along the center line M via unlocking openings 45a and 45b provided on the second guide part 4, on the (lower) end side 4b thereof.

The distance between the two unlocking pins 71 and 72 is dimensioned such that the unlocking pins 71 and 72, on being pushed in in the interior of the pane guide element SFE, act on the locking hooks 301a and 302a, which are each in their latching position, and press said locking hooks inward. As the unlocking element 7 and its unlocking pins 71 and 72 are increasingly pushed in, the latching between the guide parts 3 and 4 is therefore released, and therefore the first guide part 3 can be pulled out separately from the second guide part 4 and upward (in the direction Z) along the guide element 2.

Figure 7A:
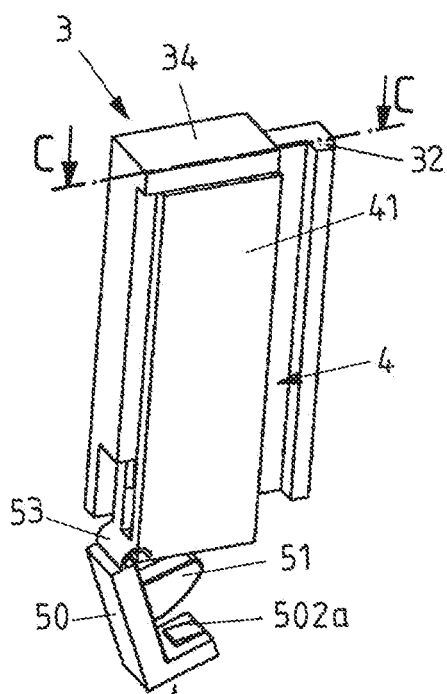
FIGS. 7A-7D show a further variant embodiment of a two-part pane guide element, in which a securing element is formed integrally with one of the guide parts, but is mounted pivotably thereon via a film hinge.
Figure 7B:
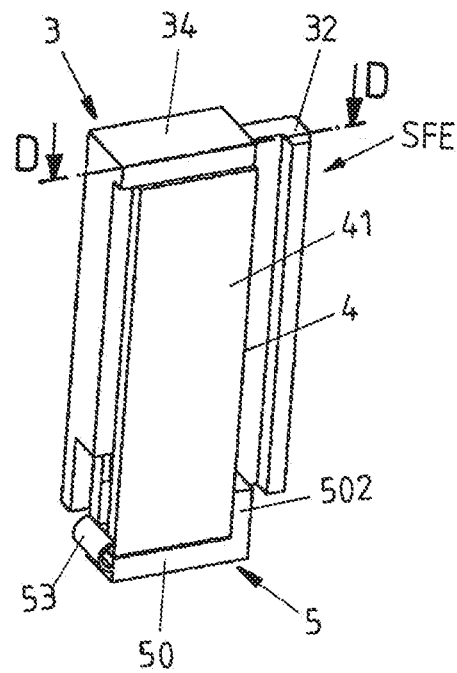
Figure 7C:
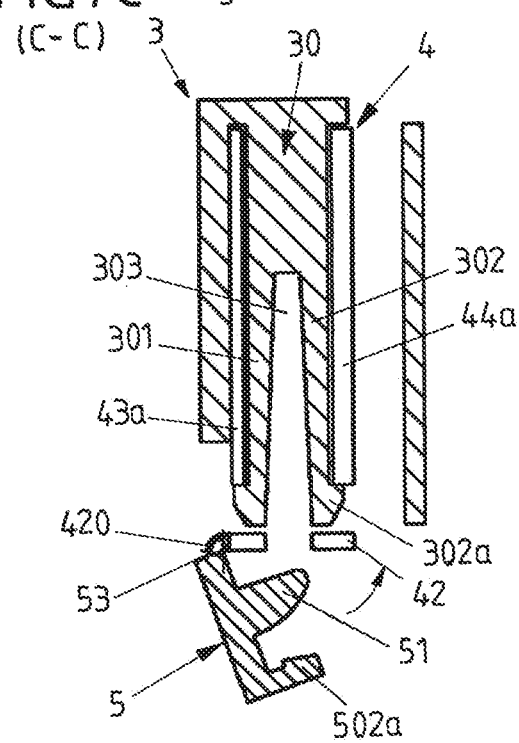
Figure 7D:
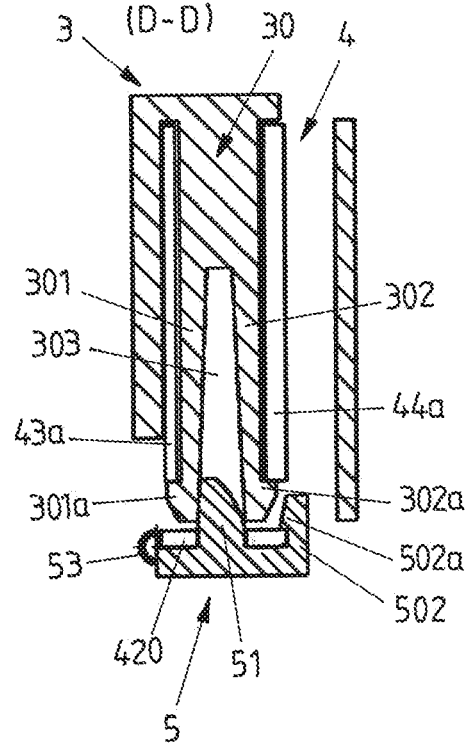

FIGS. 6A to 6C and 7A to 7D show two further variants of a pane guide element SFE, in which the first guide part 3 is formed with two locking hooks 301a and 302a, which are mounted in a spring-elastic manner, corresponding to the variant of FIGS. 5A to 5F, but, for the additional securing of the respective latching position of the locking hooks 301a and 302a, an additional part of the pane guide element SFE is provided in the form of a securing element 5.

Said securing element 5 in each case has a securing portion, which protrudes from a base 50, in the form of a securing pin 51 which, in the latched state of the two guide parts 3 and 4, can be plugged into a securing channel 303 formed between the two locking hooks 301a and 302a and the spring webs 301 and 302 thereof. The securing channel 303 tapers conically here in the direction of the end body 34 of the first guide part 3 and, in the latched state of the two guide parts 3 and 4, lies opposite an insertion opening 420 in an end-side base portion 42 of the second guide part 4. The securing pin 51 can be pushed into the securing channel 303 via said insertion opening 420.

Via the pushed-in securing pin 51, the spring webs 301 and 302 are then spread further outward or at least secured in their spread position, in which the locking hooks 301a and 302a are snapped into the latching openings of the second guide part 4. The securing portion 51, which is pushed into the securing channel 303, of the securing element 5 thus blocks the locking hooks 301a and 302a against shifting inward and therefore out of their respectively taken-up latching position.

In the variant of FIGS. 6A to 6C, the base 50, which is U-shaped in cross section, of the securing element 5 furthermore in each case forms a clip hook 501a or 502a on two protruding legs 501 and 502, between which the securing pin 51 extends. The securing element 5 can be clipped onto the second guide part 4 (from below, i.e. in the direction +Z) via said clip hooks 501a and 52a. The securing element 5 then latches here to the base portion 42 of the second guide part 4 by the clip hooks 501a and 502a each engaging behind the base portion 42 and snapping into place at a lateral recess.

While the securing element 5 in the variant of FIGS. 6A to 6C is designed as a separate component which is plugged subsequently onto the guide parts 3 and 4 which are already latched to each other, in the variant embodiment of FIGS. 7A to 7D the second guide part 4 and the securing element 5 are of integral design. However, the securing element 5 is mounted adjustably on the second guide part 4. For this purpose, the securing element 5 is mounted in an articulated manner on the (lower) end side 4b of the second guide part 4 via a film hinge 53. The securing element 5 can thus be pivoted from an assembly position, which is taken up for the connection of the two guide parts 3 and 4, into a securing position. In said securing position, the securing pin 51, which is curved convexly here on one side, is plugged via the insertion opening 420 of the second guide part 4 into the securing channel 303 of the first guide part 3. It is ensured via the convex curvature on one side of the securing pin 51 that, during the pivoting of the securing element 5 into its securing position, the securing pin 51 can be guided past the locking hook 302a and, in the securing position, the securing pin 51 blocks both locking hooks 301a and 302a against undesirable shifting.

In order to secure the securing position of the securing element 5 of the variant of FIGS. 7A to 7D, the securing element 5 also has at least one leg 502 here with a clip hook 502a which, in the securing position, snaps into place on the second guide part 4.

Figure 8E:
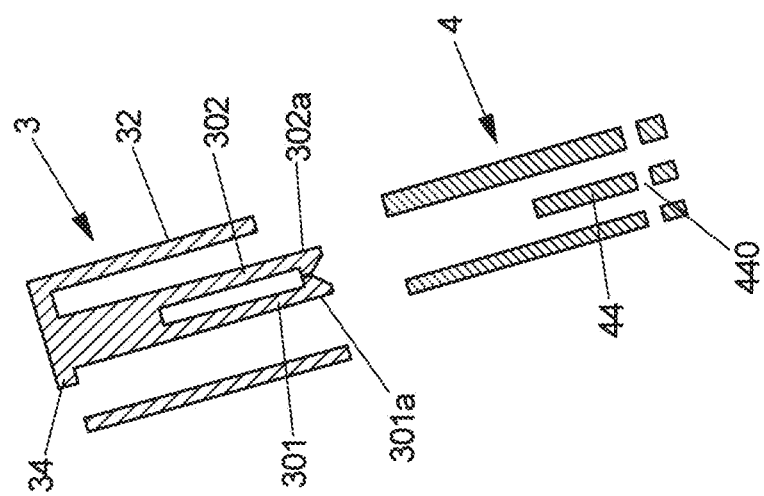
Figure 8F:
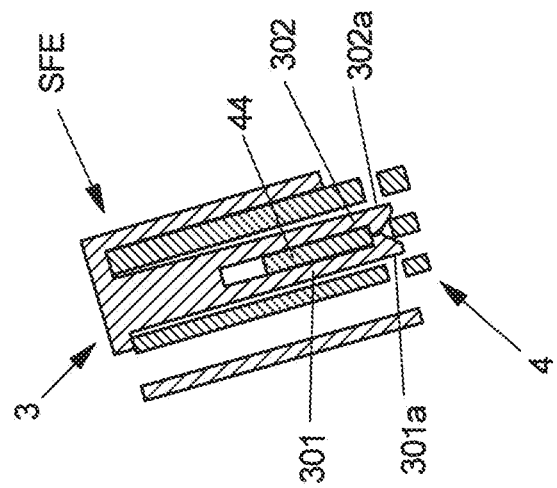

FIGS. 8A to 8F show a further variant embodiment of a two-part pane guide element SFE, in which spring webs 301 and 302 which lie on the inside on the first guide part 3 and have locking hooks 301a and 302a formed at their ends are again present. However, in contrast to the previously explained variant embodiments, the locking hooks 301a and 302a are not prestressed here outward in an opposed manner to each other via the spring webs 301 and 302, but rather inward toward each other. Accordingly, the locking hooks 301a and 302a are also oriented with respect to each other such that, in a state plugged in onto the second guide part 4, said locking hooks engage jointly behind one and the same latching web 44, located on the inside, of the second guide part 4 and, for this purpose, snap into place on a latching opening 440 from different sides.

It should also be mentioned at this juncture that, when the locking hooks 301a and 302a are snapped into place (as also when the locking hook 310 of the variant of FIGS. 1A to 4D is snapped into place), latching of the two guide parts 3 and 4 to each other as intended is preferably acoustically perceptible to a fitter. If the fitter hears a characteristic clicking noise, it can be assumed that the two guide parts 3 and 4 are mechanically latched to each other as intended.

In order to open the latching connection, provided via the latching hooks 301a and 302a, between the two guide parts 3 and 4, an unlocking element 7 with two protruding unlocking pins 71 and 72 can also be used in this variant. Via said unlocking pins, the locking hooks 301a and 302a are then pressed apart counter to the spring force applied by the spring webs 301 and 302 and are consequently spread in order to disengage the locking hooks 301a and 302a.

Alternatively, in this variant, the bringing of an unlocking tool E, for example in the form of a screw driver, up to the two spring webs 301 and 302 is provided. The bringing up takes place via unlocking openings 35 and 45 of the two guide parts 3 and 4, said unlocking openings being brought to coincide in the latched state of the guide parts 3 and 4 with each other. An unlocking opening 35 is provided on an inner side 3a of the first guide part 3, said inner side forming an outer surface of the assembled pane guide element SFE. The plugging of the unlocking tool E into the inner unlocking opening 45 of the second guide part 4 is made possible via said unlocking opening 35. Via the unlocking opening 45, the receiving channel 40 is in turn accessible and consequently so too are the spring webs 301 and 302, which are accommodated therein, of the first guide part 3. By means of the plugged-in unlocking tool E, the two spring webs 301 and 302 can therefore be spread, for example by rotation of the unlocking tool E, and therefore the locking hooks 301a and 302a can be shifted out of their respective latching position.

Furthermore, via the unlocking openings 35 and 45, an eccentric element can be plugged into the pane guide element SFB, said eccentric element spreading the two spring webs 301 and 302 upon rotation in order to be able to separate the guide parts 3 and 4 from each other. In principle, it can furthermore be provided that the unlocking opening 35 of the first guide part 3, which is accessible from the outside on the inner side 3a which (virtually) completely overlaps the second guide part 4 in the assembled state of the pane guide element SFE, is closed by a cover element.

FIGS. 9A to 9G show, in various views and phases during the assembly, a further variant of a multi-part—here 3-part—pane guide element SFE, in which a second guide part 4 is again adhesively bonded onto the inner side of the window pane FS in the vicinity of the lateral pane edge SB and the other, first guide part 3 can be pre-positioned displaceably via a guide portion 32 on a rear guide element 2 of the window frame R. The second guide part 4 here forms a hollow-cylindrical portion into which a circular-cylindrical insertion pin 30 of the first guide part 3 can be plugged. The insertion pin 30 is surrounded here by an edge portion, which is semicircular in cross section, of the first guide channel 3, and therefore, when the insertion pin 30 is plugged into the receiving channel 40 of the second guide part 4, the first guide part is simultaneously also pulled over a large part of the circumferential surface of a cylinder wall 43, bordering the receiving channel 40, of the second guide part 4. The guide parts 3 and 4 which are plugged onto each other in the manner of a hinge are still rotatable relative to each other at least before latching, as a result of which aligning the window pane FS during the assembly may be facilitated.

For the latching of the two guide parts 3 and 4 on each other, the insertion pin 30 has multiple slots on the end side and is divided into a plurality of elongate, spring-elastic segments. That end of the insertion pin 30 which is segmented in this manner in the longitudinal direction and lies in the direction of the second guide part 4 forms a locking hook at each of its segments for latching to the cylinder wall 43 of the second guide part 4. The multi-slotted end of the insertion pin 30 is thereby initially compressed upon plugging into the receiving channel 40 of the guide part 4 and automatically spreads at the opposite end after emerging from the receiving channel 40, in order to engage behind the cylinder wall 43 of the receiving channel 40 when the insertion pin 30 has been maximally pushed into the receiving channel 40.

In order to secure the latching, a securing element 5 is subsequently plugged onto that end of the insertion pin 30 which is plugged through the receiving channel 40, to be precise into a securing channel 3040 of the insertion pin 30. Said securing channel 3040 is formed in the insertion pin 30, which is at least partially hollow in this variant embodiment, and is accessible via the end forming the locking portion 304.

By means of the securing element 5, which is plugged into said securing channel 3040, of the pane guide element SFE, shifting of the individual segments of the locking portion 304, said segments forming the locking hooks and bordering the securing channel 3040, inward is blocked and separation of the guide parts 3 and 4 from each other is no longer possible—at least without previous removal of the securing element 5.

The securing element 5 here is of circular-cylindrical design, for example in the form of a stopper, a multi-stage, i.e. at least two-stage bolt, or an expanding rivet, and is held in the securing channel 3040 via a nonpositive lock, for example via an interference fit. For this purpose, the securing element 5 can also have a locally roughened circumferential surface, via which the securing element 5 lies against the segmented inner wall of the securing channel 3040. Alternatively, the securing element can also be designed, for example, as an (inner) securing ring.

Via the exemplary embodiments illustrated here of a window lifter assembly according to the invention and of an assembly method described in this connection, in the case of a window lifter for a flush pane design a window pane FS with front and rear pane guide elements 1 and 4 fixed thereon can be fitted in a comparatively simple and rapid manner from above a window sill, wherein at least one of the connections is provided for edge-side guidance on the window opening via a clip connection, here the connection of the rear pane guide element 1 on the rear body-side or door-side guide 2 in the vicinity of the B pillar. Assembly of a window pane FS, which, in its closed position, ends flush with body parts bordering the window opening, on a vehicle door T which does not have a removable outer door skin is thus also possible. In fact, the installation of the window pane FS for what is referred to as a "flush glass" or "flush glazing" window lifter system is also possible in the case of a vehicle door T which is produced according to a customary two-shell door concept.

LIST OF REFERENCE SIGNS 1 first guide element
2 second guide element
20 guide channel
21 seal intersection
3 first guide part
30 insertion pin (insertion portion)
300 insertion cone
301, 302 spring web
301a, 302a locking hook (locking portion)

303 securing channel
304 locking portion
3040 securing channel
31 spring web
310 locking hook (locking portion) guide portion
32x, 32y guide surface
33 spring bow (spring element)
34 end body
346 plug-in opening (intersection)
35 unlocking opening
3a inner side
4 second guide part
40 receiving channel
41 connecting portion
42 base portion
420 insertion opening
43 cylinder wall
440 latching opening
43a, 44, 44a latching web
45, 45a, 45b unlocking opening
4a, 4b end side
5 securing element
50 base
501, 502 leg
501a, 502a clip hook
51 securing pin (securing portion)
53 film hinge (joint)
6 positioning aid
60 holding bar/holding cable (holding part)
600 holding hook
61 handle
610 gripping opening
613 plug-in pin
7 unlocking element
70 base
71, 72 unlocking pin
B panel
D mirror triangle
E unlocking tool
FS window pane
M center line
O window opening
R window frame
RA, RB lateral frame part
RC upper frame part/upper door frame
SA, SB lateral pane edge
SFE pane guide element
T vehicle door
TAB outer door panel (outer door skin)

The invention claimed is:

1. A window lifter assembly, comprising an adjustable window pane for a vehicle window lifter, in which the window pane in a closed state is flush with at least one of an upper or a lateral body part which borders a window opening, to be closed by the window pane, in a window frame, wherein the window lifter assembly furthermore has at least the following:
at least one pane guide element which is fixed on the window pane in a region of a lateral pane edge, and
at least one frame-side guide element at which the pane guide element is held displaceably on the window opening,
wherein the at least one pane guide element is of multi-part design with at least one first guide part and a second guide part, the at least one pane guide element in its assembled state being displaceable along the at least one frame-side guide element, wherein
the first guide part forms a guide portion via which the pane guide element is held displaceably on the frame-side guide element,
the second guide part forms a connecting portion via which the pane guide element is fixed on the window pane, and
the first guide part and the second guide part are designed as components which are separate from each other, wherein the second guide part is fixable on the window pane independently of the first guide part, and the first guide part is displaceable on the frame-side guide element independently of the second guide part before the pane guide element is assembled as intended.

2. The window lifter assembly as claimed in claim 1, wherein the first guide part which is displaceable on the frame-side guide element, and the second guide part which is to be fixed on the window pane
each have a mechanical intersection for connecting the first and second guide parts to each other, or
each have a mechanical intersection for connecting the first and second guide parts to at least one coupling part of the pane guide element, via which a connection between the first guide part and the second guide part is provided.

3. The window lifter assembly as claimed in claim 1, wherein the first guide part which is displaceable on the frame-side guide element and the second guide part which is to be fixed on the window pane are connectable to each other, specifically by one of the first or second guide parts being displaced along a portion of another one of the second or first guide parts.

4. The window lifter assembly as claimed in claim 3, wherein the window pane is to be raised and lowered along an adjustment axis in order to close or to open up the window opening, and the first guide part and the second guide part are connectable to each other by
the first guide part which is already held displaceably on the frame-side guide element being pushed along the adjustment axis in the direction of the second guide part, or
the second guide part which is already fixed on the window pane being pushed with the window pane along the adjustment axis in the direction of the first guide part.

5. The window lifter assembly as claimed in claim 1, wherein the first guide part and the second guide part are configured to be plugged into each other.

6. The window lifter assembly as claimed in claim 1, wherein in the assembled state of the pane guide element, at least one portion of a first or second guide part is received in, another of the second or first guide part.

7. The window lifter assembly as claimed in claim 1, wherein the first guide part has an intersection for a positioning aid of the window lifter assembly, the positioning aid being configured to be connected releasably to the first guide part and via the positioning aid the first guide part being held in a preassembly position on the frame-side guide element before the assembly of the pane guide element.

8. The window lifter assembly as claimed in claim 7, the positioning aid comprises a holding part via which the positioning aid is connectable to a frame part of the window frame.

9. The window lifter assembly as claimed in claim 1, wherein the first guide part has an intersection for a positioning aid of the window lifter assembly, which positioning aid is to be connected releasably to the first guide part, wherein the positioning aid comprises a handle, and wherein, during the assembly of the window lifter assembly, the first guide part, which is connected to the positioning aid, can be displaced manually along the frame-side guide element via the handle.

10. The window lifter assembly as claimed in claim 1, wherein at least one of the first and second guide parts has at least one elastically shiftable locking portion which secures a form-fitting connection between the first and second guide parts or between a coupling part of the pane guide element and at least one of the first and second guide parts when the first and second guide parts take up a predetermined relative position to each other on the at least one pane guide element after being assembled.

11. The window lifter assembly as claimed in claim 10, wherein
the at least one elastically shiftable locking portion of the first or second guide part is designed to automatically latch to a portion of another one of the second or first guide parts or to a portion of the coupling part, when the first and second guide parts take up the predetermined relative position to each other.

12. The window lifter assembly as claimed in claim 10, wherein at least one unlocking opening is provided on at least one of the first and second guide parts via which unlocking opening, on the assembled pane guide element, a portion of an unlocking element or a portion of an unlocking tool is configured to interact with the first or second guide part in order to shift the locking portion and in order to be able to separate the first and second guide parts from each other or the coupling part from at least one of the first and second guide parts.

13. The window lifter assembly as claimed in claim 10, wherein
the pane guide element comprises a securing element which blocks the at least one elastically shiftable locking portion against shifting out of a latching position, in which locking position the locking portion is latched to the other one of the second or first guide parts or to the coupling part.

14. The window lifter assembly as claimed in claim 13, wherein
the securing element comprises a securing portion which, inserted into an opening or a channel, which is bordered by the locking portion, blocks the locking portion against shifting.

15. The window lifter assembly as claimed in claim 13, wherein
the securing element is mounted adjustably on one of the first or second guide parts or on the coupling part.

16. The window lifter assembly as claimed in claim 13, wherein the securing element is designed as a separate component which is connectable to at least one of the guide parts or to the coupling part after the at least one locking portion has taken up its latching position.

17. The window lifter assembly as claimed in claim 1, wherein, via the at least one pane guide element, the window pane is guided on the frame-side guide element both along a first transverse direction, which extends substantially parallel to a pane plane defined by the window pane, and also along a second transverse direction, which extends substantially perpendicularly to the pane plane.

18. The window lifter assembly as claimed in claim 1, wherein a spring element for elastically supporting the pane guide element on the frame-side guide element is provided on the first guide part.

19. A window lifter assembly, comprising an adjustable window pane for a vehicle window lifter, in which the window pane in a closed state is flush with upper and/or lateral body parts which border a window opening, to be closed by the window pane, in a window frame, wherein the window lifter assembly furthermore has at least the following:
at least one pane guide element which is fixed on the window pane in the region of a lateral pane edge, and
at least one frame-side guide element at which the pane guide element is held displaceably on the window opening
wherein the at least one pane guide element is of multi-part design with at least one first guide part and a second guide part, wherein
the first guide part forms a guide portion via which the pane guide element is held displaceably on the frame-side guide element,
the second guide part forms a connecting portion via which the pane guide element is fixed on the window pane, and
the first guide part and the second guide part are designed as components which are separate from each other, wherein the second guide part is fixable on the window pane independently of the first guide part, and
the first guide part is displaceable on the frame-side guide element independently of the second guide part before the pane guide element is assembled as intended, and
wherein the first guide part has an intersection for a positioning aid of the window lifter assembly, which positioning aid is to be connected releasably to the first guide part, and wherein, during the assembly of the window lifter assembly, the first guide part, which is connected to the positioning aid, can be displaced manually along the frame-side guide element via the handle.

20. A window lifter assembly, comprising an adjustable window pane for a vehicle window lifter, in which the window pane in a closed state is flush with upper and/or lateral body parts which border a window opening, to be closed by the window pane, in a window frame, wherein the window lifter assembly furthermore has at least the following:
at least one pane guide element which is fixed on the window pane in the region of a lateral pane edge, and
at least one frame-side guide element at which the pane guide element is held displaceably on the window opening
wherein the at least one pane guide element is of multi-part design with at least one first guide part and a second guide part, wherein
the first guide part forms a guide portion via which the pane guide element is held displaceably on the frame-side guide element,
the second guide part forms a connecting portion via which the pane guide element is fixed on the window pane, and
the first guide part and the second guide part are designed as components which are separate from each other, wherein the second guide part is fixable on the window pane independently of the first guide part, and
the first guide part is displaceable on the frame-side guide element independently of the second guide part before the pane guide element is assembled as intended, wherein at least one of the first and second guide parts has at least one elastically shiftable locking portion which secures a form-fitting connection between the first and second guide parts or between a coupling part of the pane guide element and at least one of the first and second guide parts when the first and second guide parts take up a predetermined relative position to each other on the at least one pane guide element after being assembled, and wherein at least one unlocking opening is provided on at least one of the first and second guide parts via which unlocking opening, on the assembled pane guide element, a portion of an unlocking element or a portion of an unlocking tool is configured to act with the first or second guide part in order to shift the locking portion and in order to be able to separate the first and second guide parts from each other or the coupling part from at least one of the first and second guide parts.

\* \* \* \* \*